United States Patent
Cooprider et al.

(10) Patent No.: US 8,345,737 B2
(45) Date of Patent: Jan. 1, 2013

(54) DETECTION OF NETWORK IMPAIRMENTS THROUGH TILT-NORMALIZED MEASUREMENT DATA

(75) Inventors: Daniel Eugene Cooprider, Greenwood, IN (US); Gregory W. Massey, Greenfield, IN (US); Thomas Renken, Indianapolis, IN (US); Loren Eggert, Indianapolis, IN (US)

(73) Assignee: Acterna LLC, Germantown, MD (US)

( * ) Notice: Subject to any disclaimer, the term of this patent is extended or adjusted under 35 U.S.C. 154(b) by 921 days.

(21) Appl. No.: 12/414,930

(22) Filed: Mar. 31, 2009

(65) Prior Publication Data

US 2009/0245117 A1  Oct. 1, 2009

Related U.S. Application Data

(63) Continuation-in-part of application No. 12/241,365, filed on Sep. 30, 2008.

(60) Provisional application No. 60/976,823, filed on Oct. 2, 2007.

(51) Int. Cl.
*H04B 3/46* (2006.01)
(52) U.S. Cl. .................. 375/227; 375/257; 375/261
(58) Field of Classification Search .............. 375/216, 375/224, 227, 316, 346; 348/465, 467, 558; 725/126, 127, 149
See application file for complete search history.

(56) References Cited

U.S. PATENT DOCUMENTS

| 5,231,660 A * | 7/1993 | West, Jr. ................. 380/205 |
| 6,738,511 B1 * | 5/2004 | Farrell et al. ............ 382/168 |
| 2004/0264549 A1 * | 12/2004 | Hoole ..................... 375/141 |
| 2008/0089402 A1 * | 4/2008 | Massey et al. ........... 375/227 |

* cited by examiner

*Primary Examiner* — David Ometz
*Assistant Examiner* — Eboni Hughes
(74) *Attorney, Agent, or Firm* — Matthew A. Pequignot; Pequignot + Myers LLC

(57) ABSTRACT

A method and apparatus are provided for detecting network impairments through tilt-normalized measurement data, the method including: collecting data for a network signal; computing a best-fit tilt for the collected data; performing tilt-normalization of the collected data responsive to the computed best-fit tilt; and determining whether the tilt-normalized data crosses a threshold, and if so, pattern matching the tilt-normalized data to detect a network impairment; and the apparatus including: an input unit for collecting data from a network signal; a tilt unit connected to the input unit for computing a best-fit tilt for the collected data and performing tilt-normalization of the collected data responsive to the computed best-fit tilt; and a pattern matching unit connected to the tilt unit for determining whether the tilt-normalized data crosses a threshold, and if so, pattern matching the tilt-normalized data to detect at least one network impairment.

19 Claims, 24 Drawing Sheets ical diagram of a measurement menu in
DETECTION OF NETWORK IMPAIRMENTS THROUGH TILT-NORMALIZED MEASUREMENT DATA

CROSS-REFERENCE TO RELATED APPLICATIONS

This application is a continuation-in-part of co-pending U.S. patent application Ser. No. 12/241,365, filed on Sep. 30, 2008 and entitled "CATV Digital Receiver Intermodulation Susceptibility Tester", which, in turn, claims priority under 35 U.S.C. §119 to U.S. Provisional Patent Application No. 60/976,823, filed on Oct. 2, 2007, the disclosures of which are incorporated by reference herein in their entireties for all purposes.

BACKGROUND OF THE INVENTION

The present disclosure relates to network analysis. More particularly, the present disclosure relates to normalizing measurement data and compensating for tilt to facilitate detection of network impairments.

Limit checking over multiple channels at the same time is typically only effective if the tilt of the data is at or near zero. This is a problem because users have to make limits too wide in order to account for tilt at a given location in the network. Once limits are expanded, certain error conditions such as roll-off, suck-out, and standing waves are difficult to detect. What is needed is a process for identifying these error conditions by performing tilt-normalized limit checks.

SUMMARY OF THE INVENTION

These and other issues are addressed by a method and apparatus for detection of network impairments through tilt-normalized measurement data. Exemplary embodiments are provided.

An exemplary method of the present disclosure includes collecting data for a network signal, computing a best-fit tilt for the collected data, performing tilt-normalization of the collected data responsive to the computed best-fit tilt, and determining whether the tilt-normalized data crosses a threshold, and if so, pattern matching the tilt-normalized data to detect at least one network impairment.

An exemplary apparatus of the present disclosure includes apparatus for detecting network impairments through tilt-normalized measurement data, the apparatus comprising: an input unit for collecting data from a network signal, a tilt unit in signal communication with the input unit for computing a best-fit tilt for the collected data and performing tilt-normalization of the collected data responsive to the computed best-fit tilt, and a pattern matching unit in signal communication with the tilt unit for determining whether the tilt-normalized data crosses a threshold, and if so, pattern matching the tilt-normalized data to detect at least one network impairment.

The present disclosure will be further understood from the following description of exemplary embodiments, which is to be read in connection with the accompanying drawings.

BRIEF DESCRIPTION OF THE DRAWINGS

The present disclosure will be described in greater detail with reference to the accompanying drawings, which represent exemplary embodiments thereof, in which.

DETAILED DESCRIPTION OF PREFERRED EMBODIMENTS

The present disclosure provides a method and apparatus for detection of network impairments through tilt-normalized measurement data. Intermodulation (IM) distortion is generated within a digital receiver, such as a cable television (CATV) digital receiver, when adverse signal conditions are present. Such adverse signal conditions may include too much power relative to the desired signal at frequencies above and/or below the frequency band containing the desired signal, for example.

Figure 1:
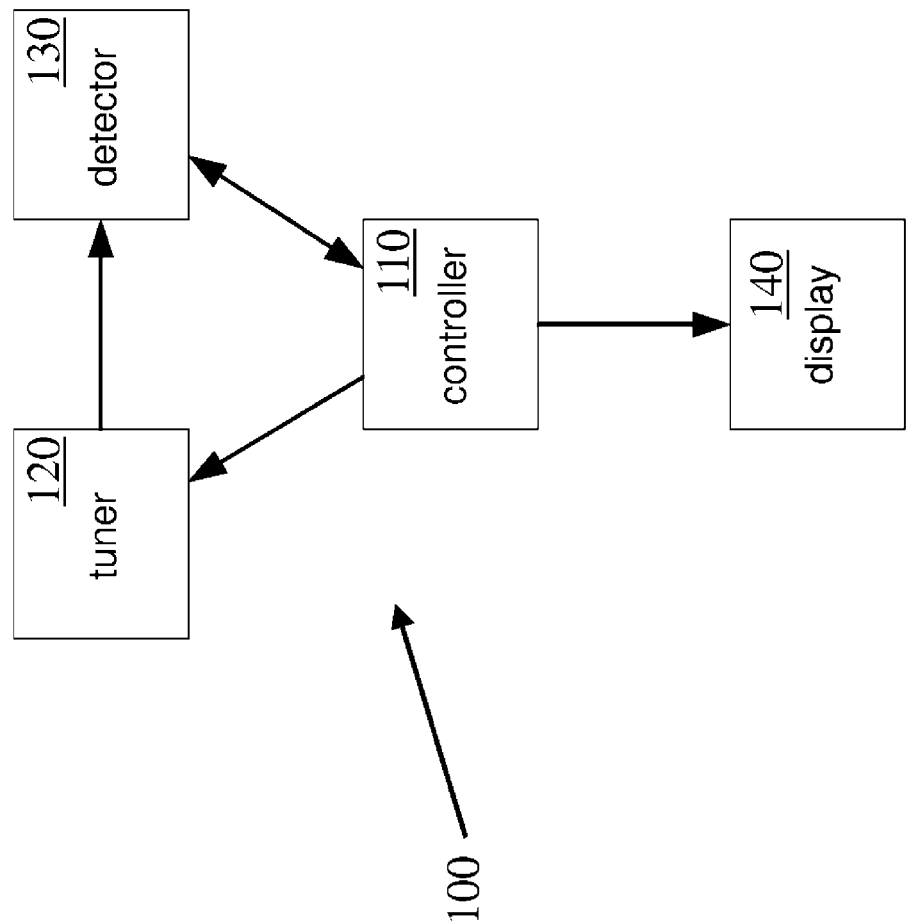
FIG. 1 is a schematic diagram of an intermodulation testing device in accordance with an exemplary embodiment of the present disclosure.

As shown in FIG. 1, an intermodulation testing device is indicated generally by the reference numeral 100. The tester 100 includes a controller 110, a radio frequency (RF) tuner 120 connected to the controller, a detector 130 connected to both the controller and the tuner, and a display 140 connected to the controller. Here, the RF tuner 120 is capable of tuning to any channel being broadcast on the CATV network. The detector 130 may include one or more appropriate detectors for measuring power of either analog TV channels and/or digital channels. The controller 110 may include non-volatile memory for storing both an operating program and configuration data. The display 140 may be as simple as an indicator light or as elaborate as a touch screen for configuring the device, selecting channels, and reporting measurement progress and results.

Figure 2:
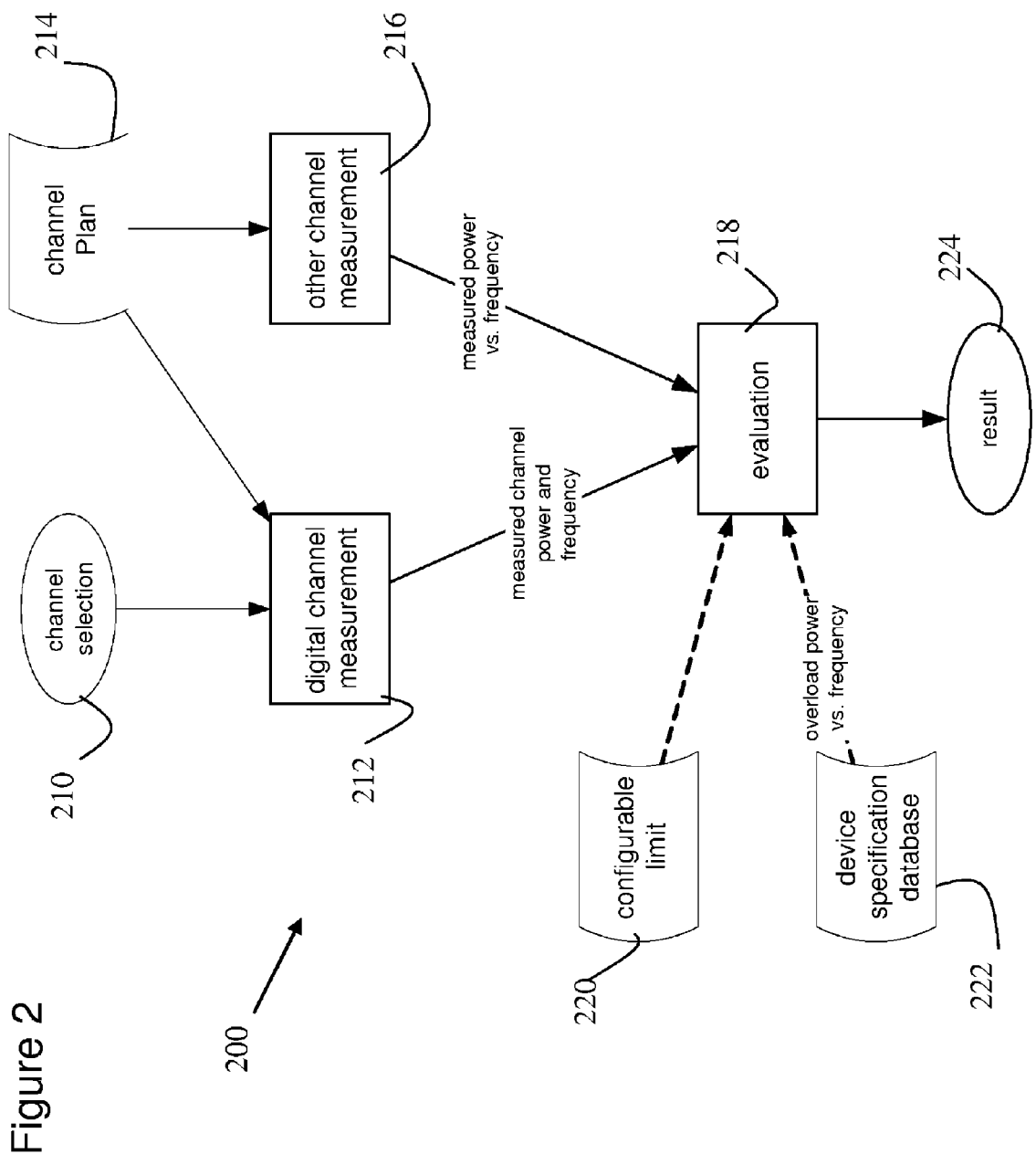
FIG. 2 is a functional diagram of a controller for the testing device of FIG. 1 in accordance with an exemplary embodiment of the present disclosure.

Turning to FIG. 2, a method executable by the controller 110 of FIG. 1 is indicated generally by the reference numeral 200. The method 200 includes a channel selection block 210, which passes control to a digital channel measurement block 212. The digital channel measurement block receives a channel plan 214, which contains a description of the channels being transmitted on the cable, including frequency and modulation type. The digital channel measurement block 212 measures the power of a selected digital channel. For example, one method of measuring the digital channel power is known in the art as Digicheck. Another less accurate method is to measure the power at the center frequency and add a bandwidth compensation factor based on the ratio of digital channel bandwidth to measurement bandwidth. The digital channel measurement block 212 may perform the power measurement periodically in order to update the display with current results.

Another channel measurement block 216 also receives the channel plan 214, and measures the power of all or a subset of the channels being transmitted. The other channel measurement block 216 may measure all the channels, or just those that could substantially contribute to intermodulation distortion. Such other measured channels could be the video carriers of the analog TV channels, for example, since they normally have the highest power. The other channel measurement block 216 may perform only one measurement for each channel, measure all of them periodically, or select a small number with the highest power and measure them periodically in order to update the display with current results.

An evaluation block 218 is connected to both the digital channel measurement block 212, for receiving measured channel power and frequency, and to the other channel measurement block 216, for receiving measured power versus frequency. The evaluation block 218 compares the power of the digital channel being tested to the power of the other channels and determines whether a device receiving the digital channel is susceptible to intermodulation distortions.

Different types of evaluations are possible in the evaluation block 218. In a first example, the evaluation block 218 may subtract the digital channel power from the highest of the other channels' measured powers. If this result is over a threshold value or configurable limit 220, the channel is indicated as susceptible. The degree of susceptibility may be indicated by the amount that the difference exceeds the threshold. In a second example, the evaluation block 218 may sum the measured powers of the other channels to get a total integrated power, and then subtract the digital channel power from this sum.

As in the first example, the evaluation block compares the value to a threshold to evaluate the susceptibility to intermodulation distortions. In a third example, the evaluation block 218 may consider the capability of a tuner to reject off-frequency signals as a function of frequency or difference in frequency between the digital channel being received and the frequency of the other signal. Here, the evaluation block 218 sums the amount by which the power of any channel other than the digital channel being evaluated exceeds the device's rejection capability. The sum of these is defined herein as the "total overload power". As in the first example, the evaluation block compares this value to a threshold to evaluate the susceptibility to intermodulation distortions.

In an alternate embodiment, the method may measure the powers of only those channels for which sums and differences of harmonic frequencies of two or three channels falls within the frequency band of the first digital channel. Here, composite second order (CSO) distortion is the sum or difference of two signals or their harmonics, and composite triple beat (CTB) distortion is the sum and/or difference of three signals or their harmonics.

The controller 110 or tester 100 of FIG. 1 may further evaluate the susceptibility of a single digital channel selected by the user. The tester may also scan all digital channels and report the susceptibility of each. The tester may report which channel is most susceptible and the particular susceptibility of only that channel. The tester may display or otherwise output a susceptibility report or result 224, which may be a pass/fail indicator and/or the degree of susceptibility, displayed either numerically or graphically. The tester may evaluate susceptibility compared to a reference specification from a device specification database 222, which database may provide overload power versus frequency. The specification may be configurable. The tester 100 may further contain a database of the susceptibility characteristics of various receiver devices. A user of the tester could select a device from the database, and the tester would report its susceptibility.

The susceptibility result 224 of this exemplary embodiment may be valid for devices connected at or near the same location as the tester. The signal may have a different tilt at other locations.

Figure 3:
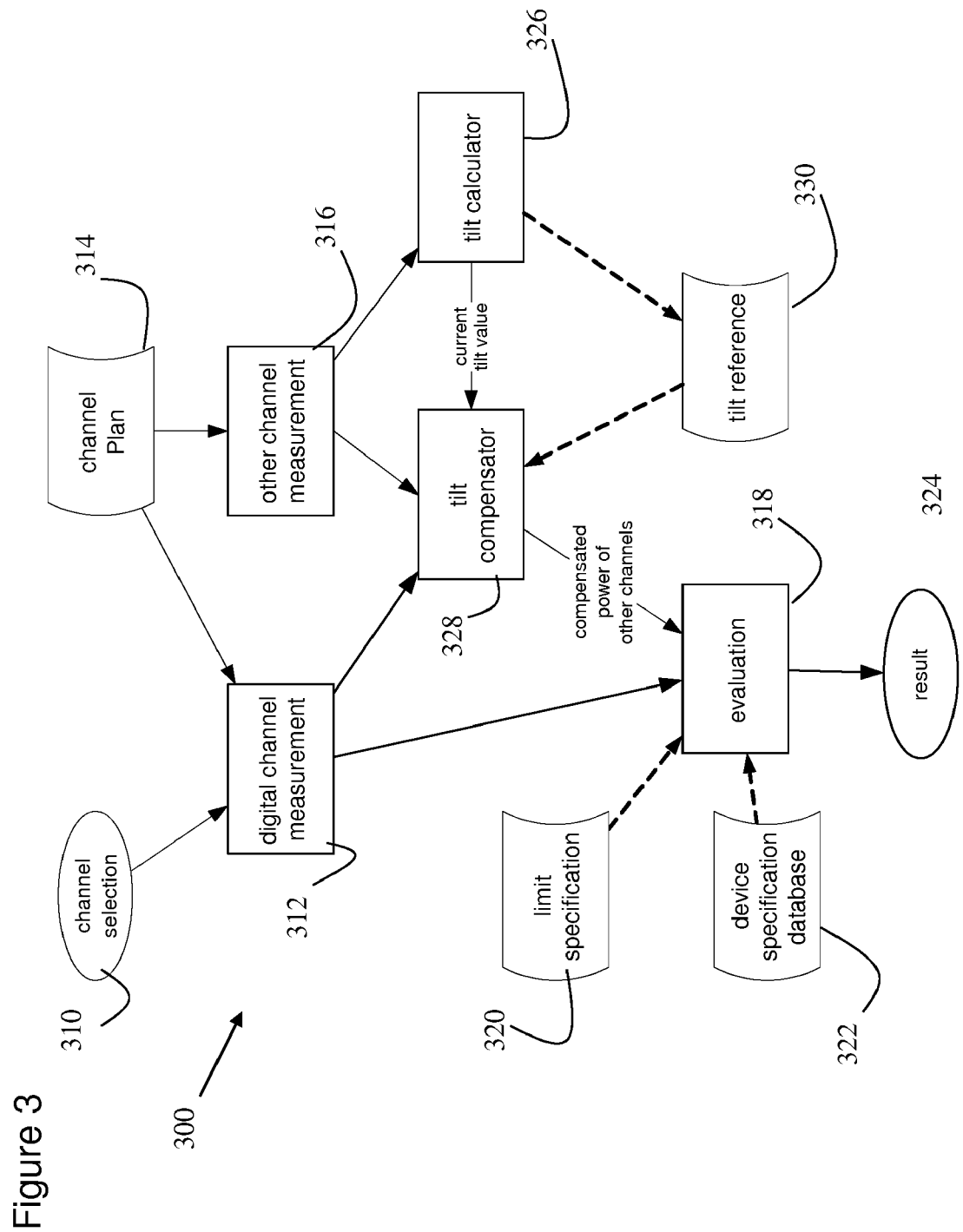
FIG. 3 is a functional diagram of a controller with tilt compensation for the testing device of FIG. 1 in accordance with an exemplary embodiment of the present disclosure.

Turning now to FIG. 3, another method executable by the controller 110 of FIG. 1 is indicated generally by the reference 300. The method 300 is similar to the method 200; so duplicate description shall be omitted. The method 300 includes extra functional blocks to perform tilt compensation, such as to measure susceptibility at other locations distant from the location of the tester 100.

The method 300 includes a channel selection block 310, which passes control to a digital channel measurement block 312. The digital channel measurement block receives a channel plan 314. The digital channel measurement block 312 measures the power of a selected digital channel. Another channel measurement block 316 also receives the channel plan 314, and measures the power of at least some of the other channels being transmitted.

A tilt calculator 326 is connected to the other channel measurement block 316, and provides a tilt reference 330. A tilt compensator 328 is connected to each of the digital channel measurement block 312, the other channel measurement block 316, and the tilt calculator 326 for receiving a current tilt value.

An evaluation block 318 is connected to both the digital channel measurement block 312 and the tilt compensator 328 for receiving compensated power of other channels. The evaluation block 318 may receive a limit specification or threshold 320 and/or information from a device specification database 322. The evaluation block 318 compares the power and/or compensated power of the digital channel being tested to the compensated powers of the other channels, determines whether a device receiving the digital channel is susceptible to intermodulation distortions, and outputs a corresponding result 324.

Preferred embodiments of the test device 100 of FIG. 1 may use a relative power ratio between the analog video channels and a digital channel in order to predict the likelihood that other devices receiving that digital channel will be impaired by internal intermodulations. Such other devices may be of different types, each having unique specifications stored in the device specification database 322, for example. A tester 100 may further generate a tilt line for use as the reference power so that the same device will give the same results at different points in the network that have different tilts.

Figure 4:
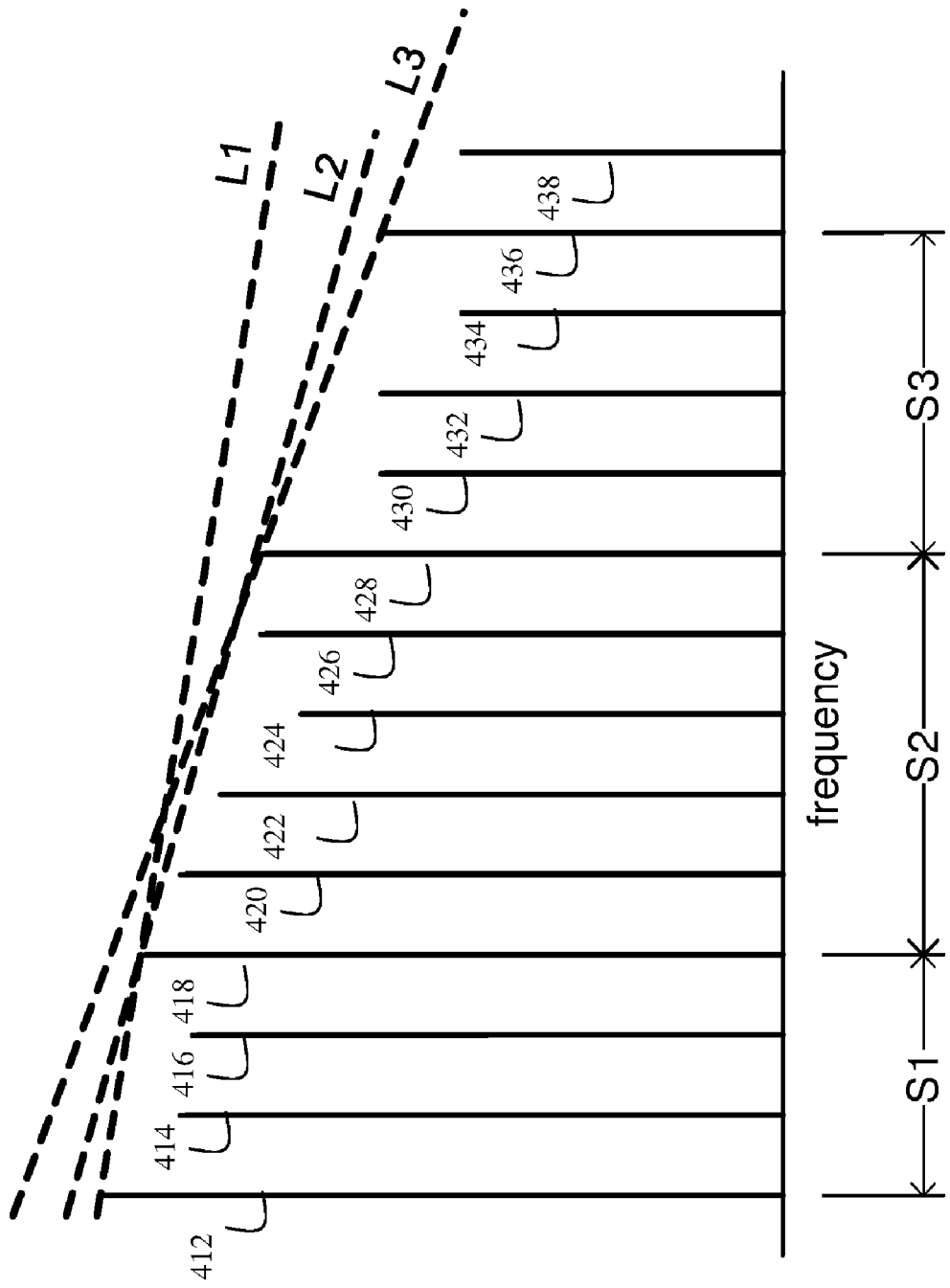
FIG. 4 is a graphical diagram of measured powers of analog channels in accordance with an exemplary embodiment of the present disclosure.

As shown in FIG. 4, a plot of measured powers of analog TV channels is generally indicated by the reference numeral 400. The plot 400 includes measured analog signal powers 412, 414, 416, 418, 420, 422, 424, 426, 428, 430, 432, 434, 436 and 438, each at a different carrier frequency. Here, a first frequency span S1 includes the measured powers 412, 414, 416 and 418. A second frequency span S2 includes the measured powers 418, 420, 422, 424, 426 and 428; and a third frequency span S3 includes the measured powers 428, 430, 432, 434 and 436. The tilt calculator 326 of FIG. 3 may use these measured powers to compute a slope of a tilt line. A tilt line is a straight line intersecting the measured levels of two of the highest channels such that all other channels have less than or equal to the power at that frequency on the tilt line.

In the exemplary plot 400, tilt lines L1, L2 and L3 are present. If two or more possible tilt lines are found, as here, the one covering the widest frequency span is used. From the three possible tilt lines, L2 is selected over L1 and L3 because it has the widest frequency span S2. If two or more tilt lines are found having equal frequency spans, the one with less tilt is used. The tilt calculator 326 outputs the slope of the tilt line, but need not calculate nor output the y-intercept.

A user may assume that the signal has no tilt at the point that subscriber equipment is connected. Alternatively, the user may use the device to measure the actual tilt at the subscriber location. If the actual tilt is used, the device may store it as a reference tilt. If known, the reference tilt value may also be entered into the device without performing a tilt measurement.

When tilt compensation is used, the device first measures the tilt. It uses the difference between the current tilt and the reference tilt to adjust the measured powers of all channels. The amount of adjustment is given by the equation:

$$tiltComp(freq) = (refTilt - currentTilt) * (freq - digFreq) \quad \text{(Eqn. 1)}$$

In Equation 1, currentTilt is the measured tilt at the current location, refTilt is the tilt at the location of the subscriber's receiver, freq is the frequency of the channel being adjusted, and digFreq is the frequency of the digital channel for which susceptibility is being evaluated. The adjustment is added to the measured value before passing it on to the evaluation block 318.

Figure 5:
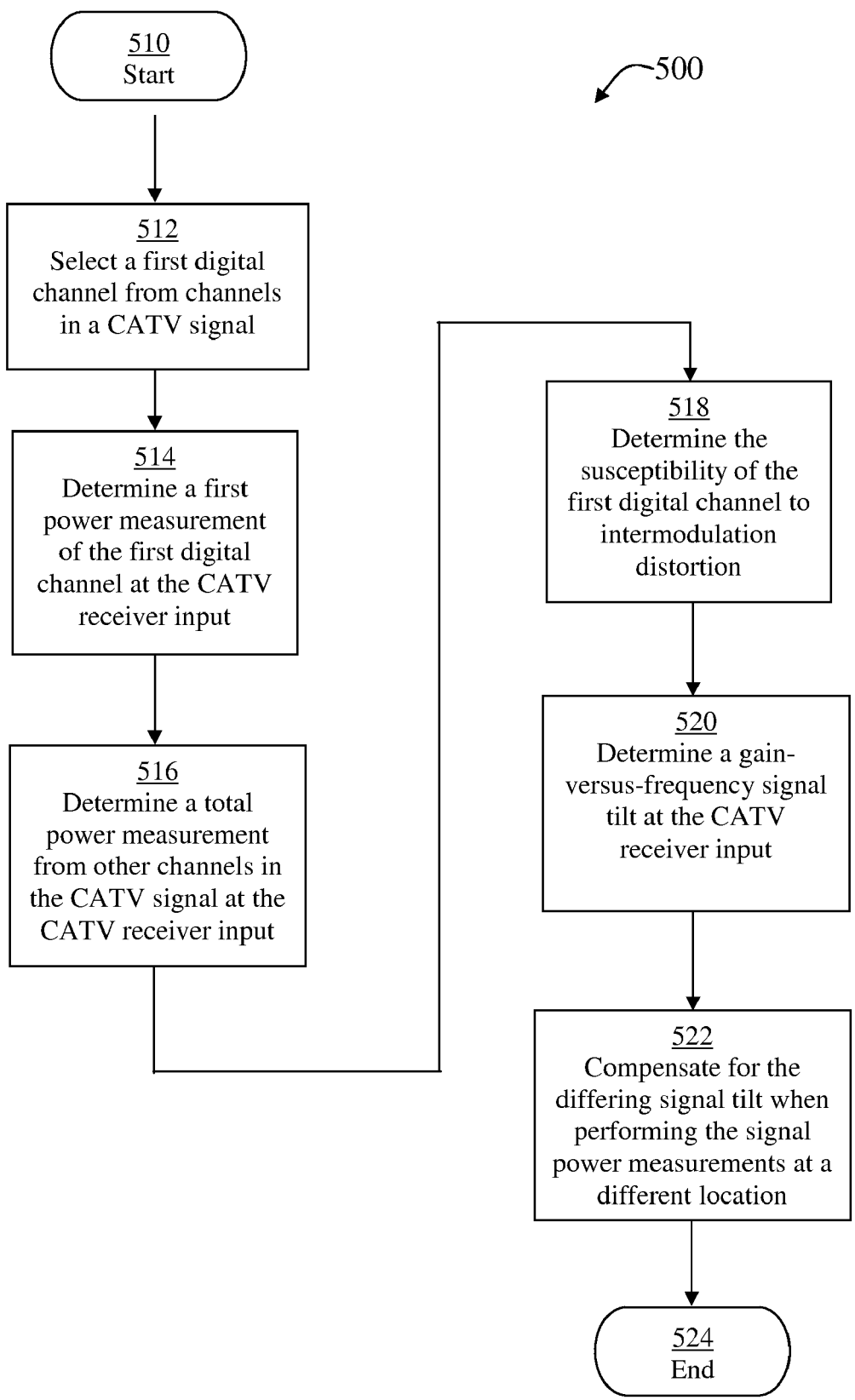
FIG. 5 is a flow diagram for a method of intermodulation susceptibility testing device in accordance with an exemplary embodiment of the present disclosure.

Turning to FIG. 5, a method for assessing susceptibility of a CATV receiver to intermodulation distortion is indicated generally by the reference numeral 500. The method 500 includes a start block 510, which passes control to a function block 512. The function block 512 selects a first digital channel from a plurality of channels in a CATV signal, and passes control to a function block 514. The function block 514 determines a first power measurement of the first digital channel at the CATV receiver input, and passes control to a function block 516. The function block 516 determines a total power measurement from one or more of the other channels in the CATV signal at the CATV receiver input, and passes control to a function block 518. The function block 518, in turn, determines the susceptibility of the first digital channel to intermodulation distortion by comparing the first and total power measurements with known intermodulation distortion characteristics of the CATV receiver.

Optionally, the method 500 may further include a function block 520, which receives control from the function block 518 and determines a level-versus-frequency signal tilt at the CATV receiver input. In addition, the method 500 may further include a function block 522, which receives control from the function block 520 and uses the level-versus-frequency signal tilt measured at the CATV receiver input to compensate for the differing signal tilt when performing the signal power measurements at a location in the network other than at the original CATV receiver input. The function block 522 may then pass control to an end block 524.

Figure 6:
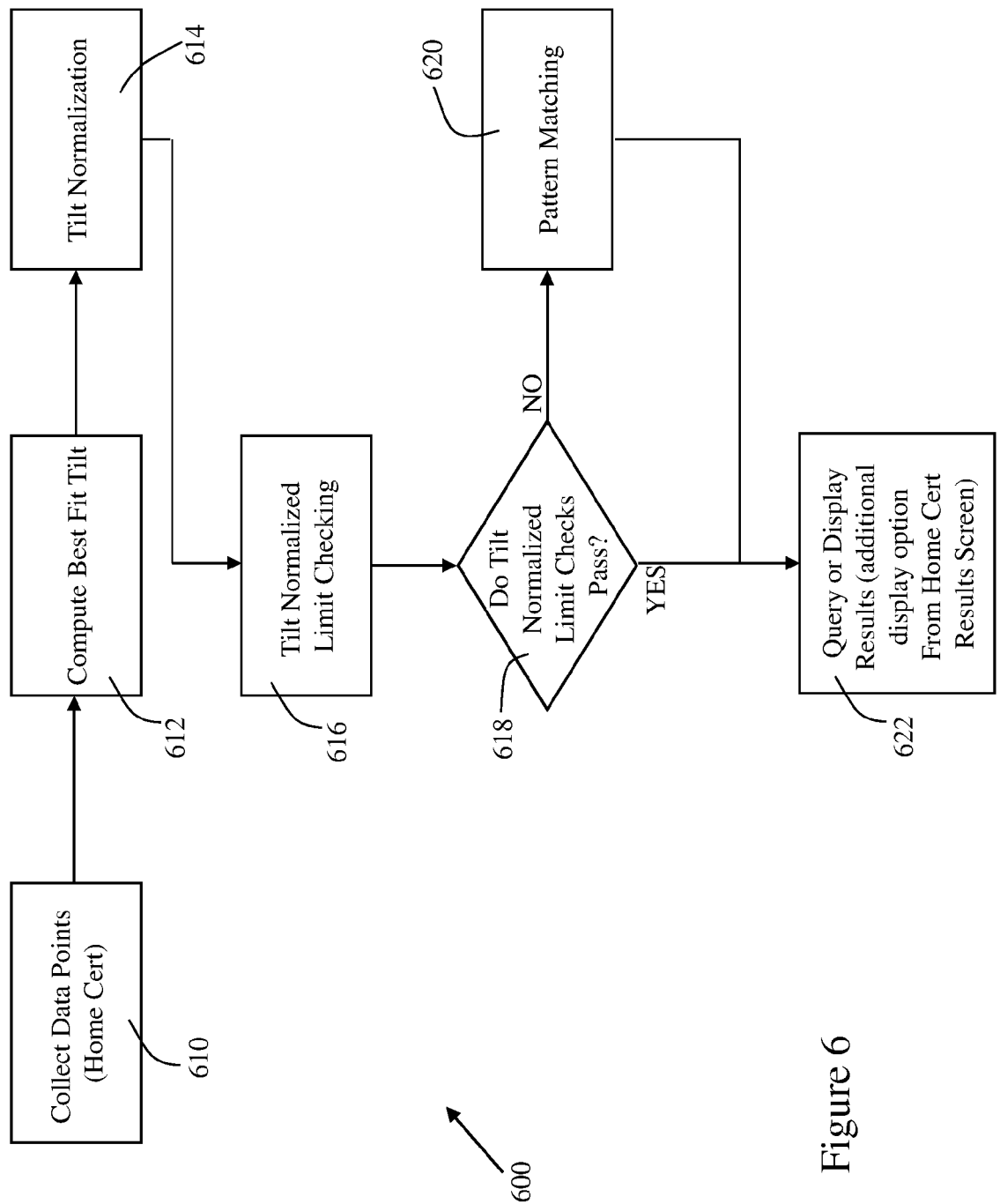
FIG. 6 is a flow diagram of a method for detection of network impairments through tilt-normalized measurement data in accordance with an exemplary embodiment of the present disclosure.

Turning now to FIG. 6, a method for detection of network impairments through tilt-normalized measurement data is indicated generally by the reference numeral 600. The method 600 includes an input block 610 to collect a set of measurement points. The block 610 passes control to a function block 612, which computes a best-fit tilt and passes control to a function block 614. The block 614, in turn, performs tilt normalization and passes control to a function block 616.

The function block 616 performs tilt-normalized limit checking, and passes control to a decision block 618, which determines whether tilt-normalized limit checks are passed. If the checks are not passed, control passes to a function block 620, which performs pattern matching and passes control to a function block 622. If, on the other hand, the checks are passed, the decision block 618 passes control directly to the function block 622. The function block 622, in turn, queries or displays the results.

In operation of the method 600, the input block 610 collects a set of data points including level, frequency, and type. Here, the type may be analog or digital, where the digital type may include Quadrature Amplitude Modulation (QAM), which is a method for encoding digital data in an analog signal in which each combination of phase and amplitude represents one of a plurality of multi-bit patterns.

The block 614 processes the data points by performing a tilt normalization of the data. For example, the tilt on a set of data may be calculated by computing the tilt between maximum points. The tilt computation with the greatest span is chosen to be the tilt of the data set. If there are multiple tilts with the same span, the minimum tilt is chosen.

An alternate process for computing the tilt of the entire data set is to compute a best fit line to the data using the following equation:

$$f(x_i) = a_0 g_0(x_i) + a_1 g_1(x_i) + a_2 g_2(x_i) + a_3 g_3(x_i) + a_4 g_4(x_i) + e_i \quad \text{(Eqn. 2)}$$

where the functions are defined as follows:

$$g_0(x) = x$$

$$g_1(x) = \begin{cases} 1 & \text{if } x \text{ is analog video} \\ 0 & \text{otherwise} \end{cases}$$

$$g_2(x) = \begin{cases} 1 & \text{if } x \text{ is QAM64} \\ 0 & \text{otherwise} \end{cases}$$

$$g_3(x) = \begin{cases} 1 & \text{if } x \text{ is QAM128} \\ 0 & \text{otherwise} \end{cases}$$

$$g_4(x) = \begin{cases} 1 & \text{if } x \text{ is QAM256} \\ 0 & \text{otherwise} \end{cases}$$

$$f(x) = \text{the level measured at frequency } x$$

$$e = \text{the error in the level measured at frequency } x$$

The linear regression will compute all constants ($a_0$, $a_1$, $a_2$, $a_3$, $a_4$) such that the sum of the squares of the error $$\sum_{i=1}^{n} (e_i)^2$$

is minimized. Constants ($a_0$, $a_1$, $a_2$, $a_3$, $a_4$) each directly correspond to useful quantities when performing normalization in a subsequent step. $a_0$ corresponds to the measured slope of the data. The computed tilt of the measured data is equal to the slope of the data times the frequency span of the data points included in the regression. Constants $a_1$, $a_2$, $a_3$, $a_4$ correspond to the computed offset that will be subtracted from the measured value of the data point so as to center the data about the origin. For example, $a_1$ is subtracted from all analog video channel measurements.

An alternate expansion to the above method uses a weighted data set. This allows for assigning low weights to outliers that might result in decreasing the reliability of the linear regression. In this case the process uses the equation:

$$w_i f(x_i) = w_i(a_0 g_0(x_i) + a_1 g_1(x_i) + a_2 g_2(x_i) + a_3 g_3(x_i) + a_4 g_4(x_i) + e_i) \quad \text{(Eqn. 3)}$$

with the goal of minimizing the weighted error:

$$\sum_{i=1}^{n} (w_i e_i)^2.$$

Multiple passes through the data may be performed to tune the weights of individual points. The algorithm here tunes the weights until the calculated slope, constants, and weights are stable, with the goal of eliminating a small number of outliers.

Thus, the function block 614 can normalize the data points using the above calculated slope and constants. This results in flattening of the data so that there is zero tilt and the data points are centered about the origin. Normalization is accomplished by solving Equation (2) for the error, $e_i$. A plot of the data points ($e_i$, $x_i$) will be the set of normalized data.

$$e_i = f(x_i) - (a_0 g_0(x_i) + a_1 g_1(x_i) + a_2 g_2(x_i) + a_3 g_3(x_i) + a_4 g_4(x_i)) \quad \text{(Eqn. 4)}$$

Next the data is analyzed. There are three forms of analysis available at this point: the tilt normalization limit checks of blocks 616 and 618, the pattern matching of block 620, and error distribution analysis, which may be performed in conjunction with block 622.

The tilt normalization limit checks of blocks 616 and 618 look for data points that reside outside of a delta or threshold from the computed linear regression. Limit checking may be computed for each type of point. For example, digital channels might be allowed to have a delta of 3 dBmV from the best-fit line, but analog channels might only be allowed to have a delta of 1 dBmV.

The pattern matching checks of block 620 may be performed if the tilt-normalized limit checks fail. Here, the method may perform an additional step of attempting to match the data set to a known problem pattern. The data points may be compared against a set of patterns and/or functions indicative of various network error conditions. Each pattern check may return a percent likelihood of a match to the pattern by performing a Euclidian distance to a known function or performing an appropriate non-linear regression technique. If the threshold is above a predetermined value, a conclusion may be drawn that the error condition is likely present. The following patterns have been identified and may be used to identify various network conditions: 1) High Frequency Roll-Off: In addition to identifying the roll-off condition, the frequency where it starts may also be identified; 2) Suck-Out: This may be able to identify the frequency where levels are decreased over a set of frequencies; and/or 3) Standing Wave: This may be able to identify that the data contains one or more standing waves. If a wave is present, the most significant wave may be analyzed to calculate the distance to the most significant impedance mismatch.

An error value distribution analysis may be performed in conjunction with the function block 622. Here, the normalized error values for each frequency may be plotted and analyzed. Various curves may indicate success or error conditions. This is an alternate approach to identify other network error conditions.

Once the data has been analyzed, a useful graph can be displayed. The contents of the display may include: a) Tilt of the best fit line; b) Results of normalized limit checks; c) Results of pattern matching, such as pass/fail or error conditions identified; d) The original and normalized data points; and/or e) Points that fail tilt-normalized limit checks can be highlighted.

Figure 7:
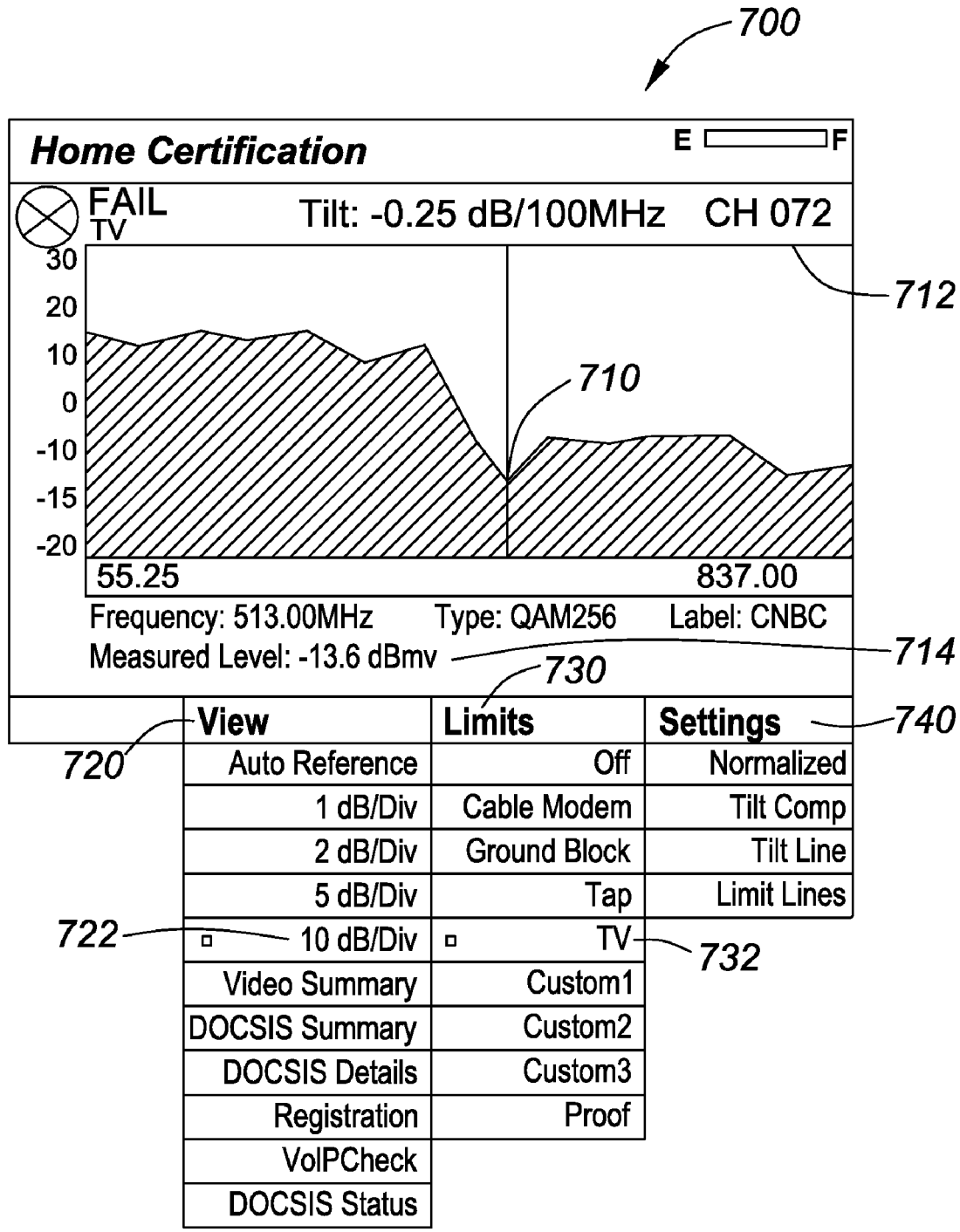
FIG. 7 is a graphical diagram of measured level versus frequency for home certification results in accordance with an exemplary embodiment of the present disclosure.

As shown in FIG. 7, an exemplary plot of the results is indicated generally by the reference numeral 700. The plot 700 shows measured level in dBmv on the vertical axis, versus frequency in MHz on the horizontal axis. A marker 710 is placed on channel 72, which is here a Quadrature Amplitude Modulation (QAM) channel at 513 MHz. A Channel indicator 712 shows that channel 72 is selected. A Measured Level indicator 714 shows a measured level of −13.6 dBmV. A View pull-down menu 720 includes selections for Auto Reference, 1 dB/Div, 2 dB/Div, 5 dB/Div, 10 dB/Div, Video Summary, DOCSIS Summary, DOCSIS Details, Registration, VoIPCheck, and DOCSIS Status. The active selection 722 on the View menu is the 10 dB/Div choice.

A Limits pull-down menu 730 includes selections for Off, Cable Modem, Ground Block, Tap, TV, Custom 1, Custom 2, Custom 3, and Proof. The active selection 732 on the Limits menu is the TV choice. A Settings pull-down menu 740 includes selections for Normalized, Tilt Compensation, Tilt Line, and Limit Lines.

The measured level of channel 72 is −13.6 dBmv, which is above a −15 dBmv minimum digital level limit. Thus, from this preliminary plot, it looks as though this test might pass. However, the data should be checked from a different perspective.

Figure 8:
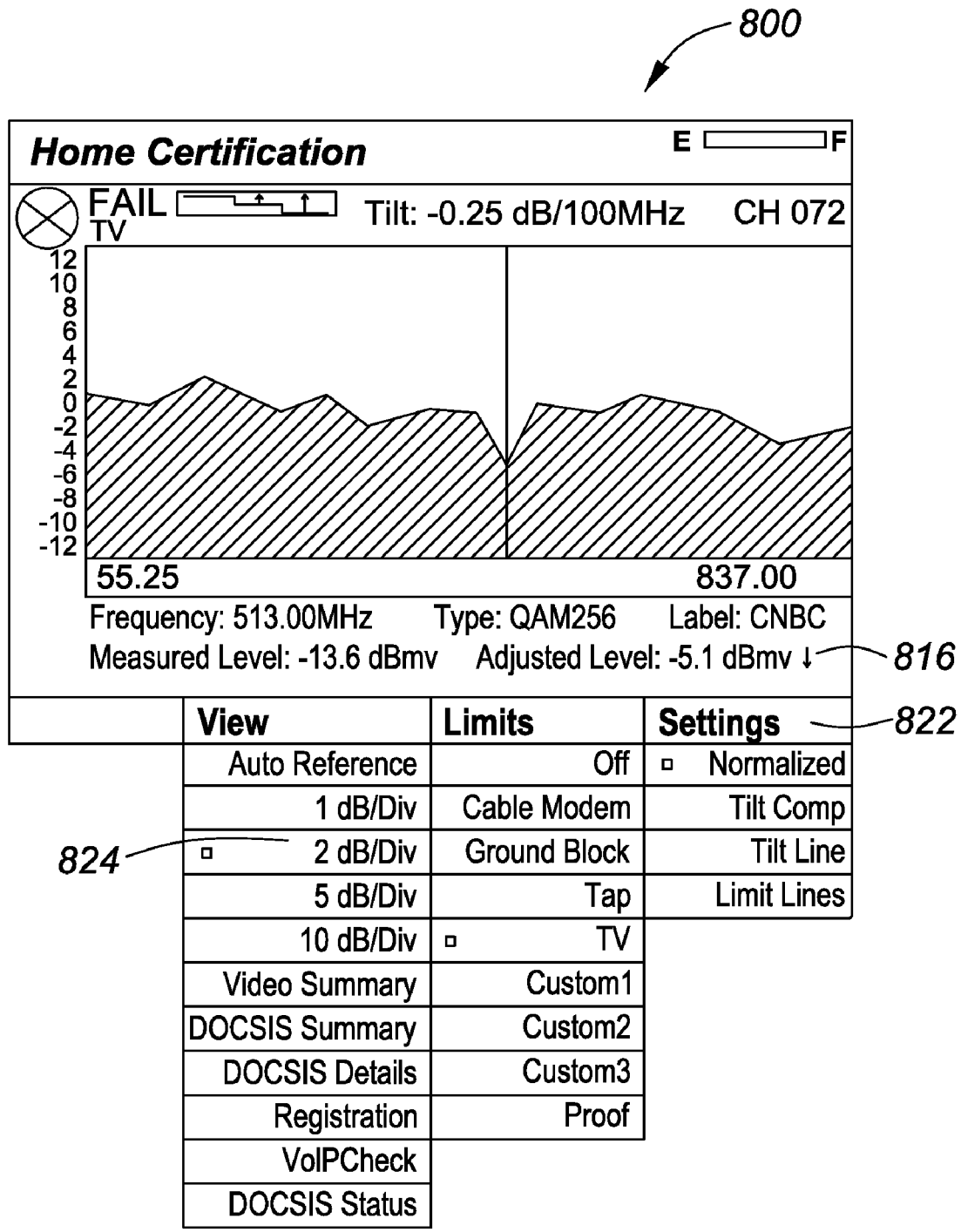
FIG. 8 is another graphical diagram of measured level versus frequency for home certification results in accordance with an exemplary embodiment of the present disclosure.

Turning to FIG. 8, another exemplary plot of the results is indicated generally by the reference numeral 800. The plot 800 is similar to the plot 700, so duplicate description may be omitted. Here, an Adjusted Level indicator 816 shows an adjusted level of −5.1 dB. The active selection 822 on the Settings menu is the Normalized choice, and an active selection 824 on the View menu is the 2 dB/Div choice. Thus, this is a view of normalized data. The plot 800 shows the analog level brought down, and the different types of digital channels brought up to reference zero on the scale. A perfect system with zero tilt would have a straight line at 0 for the full frequency range, regardless of the differences in level between ideal analog and digital signals. The adjusted level is the difference between the current point and an ideal normalized value. Here, the adjusted level of −5.1 dB indicates a failure of the test. Various other settings can be applied to make the results easier to view or understand.

Figure 9:
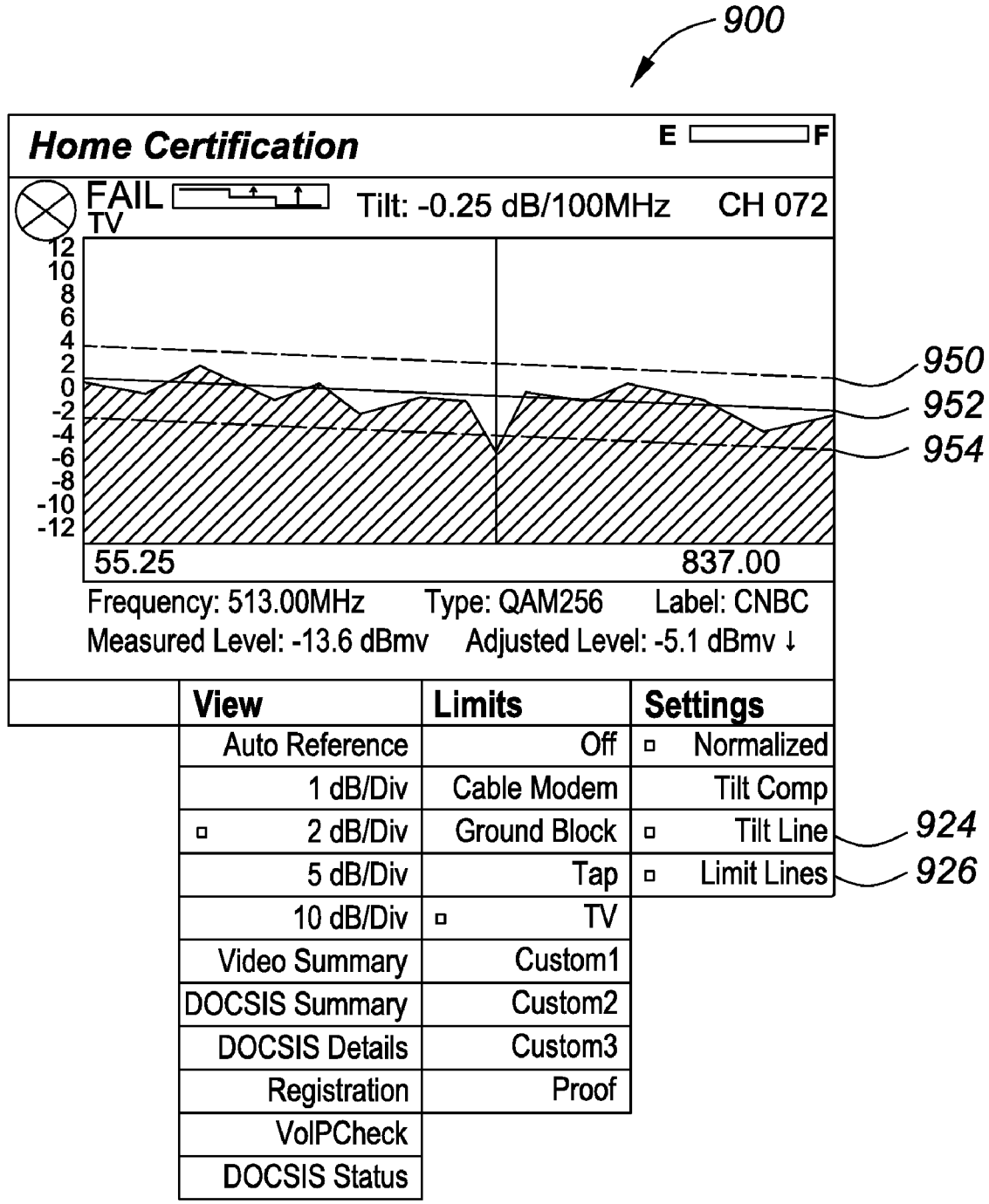
FIG. 9 is yet another graphical diagram of measured level versus frequency for home certification results in accordance with an exemplary embodiment of the present disclosure.

Turning now to FIG. 9, yet another exemplary plot of home certification results is indicated generally by the reference numeral 900. The plot 900 is similar to the plot 800, so duplicate description may be omitted. Here, additional selections from the Settings menu are active, including an active Tilt Line choice 924, and an active Limit Lines choice 926. A tilt line 952 shows the computed tilt of the system after normalization. In the subtitle bar, the measured tilt for this data is shown to be −0.25 dB per 100 MHz. Upper and lower limit lines 950 and 954, respectively, graphically show the application of a new user-defined limit. Limit lines allow the user to see how the acceptable limit values vary with frequency to account for system tilt. Here, channel 72 violated the lower limit line 954, so the test failed.

Figure 10:
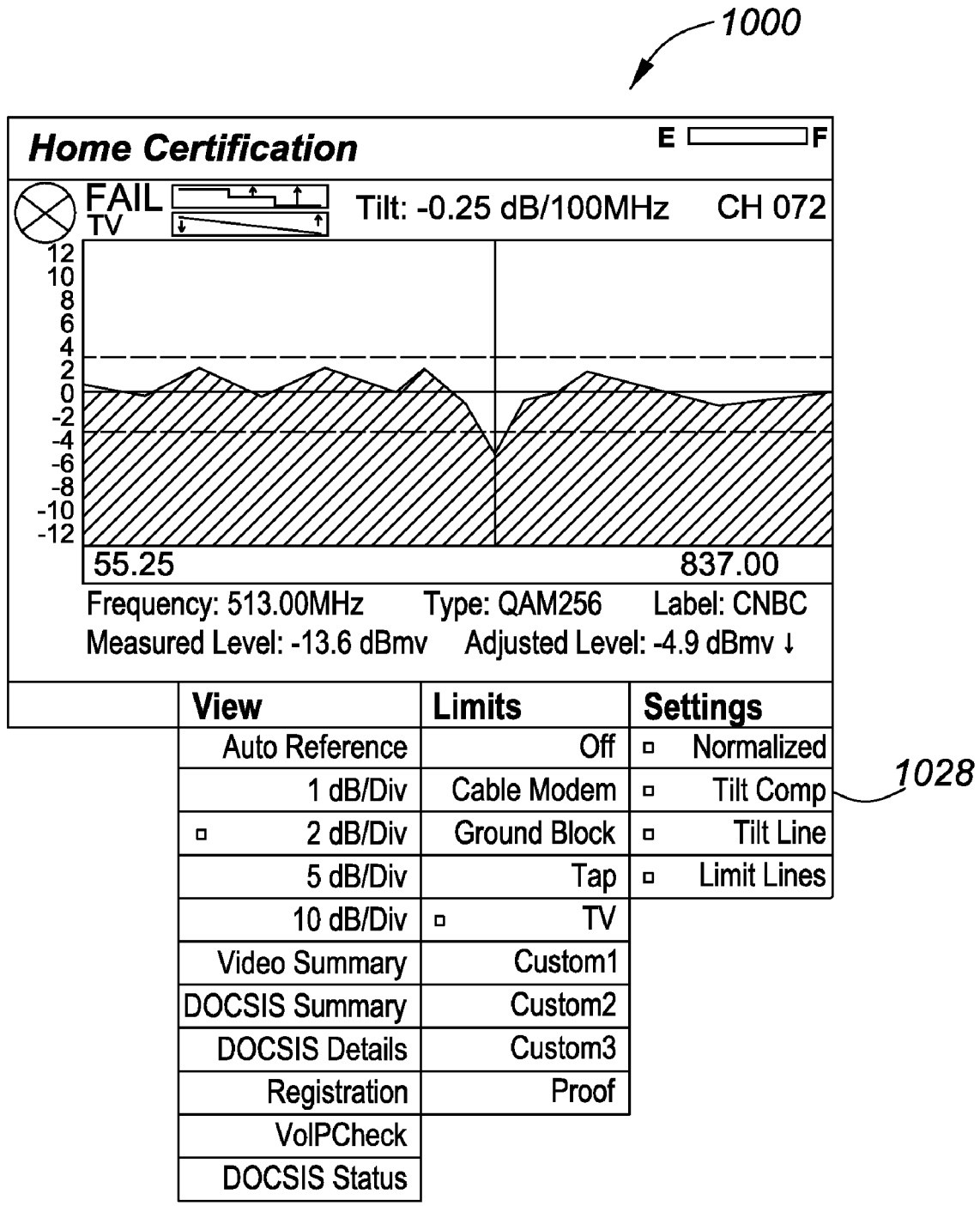
FIG. 10 is an additional graphical diagram of measured level versus frequency for home certification results in accordance with an exemplary embodiment of the present disclosure.

As shown in FIG. 10, an additional exemplary plot of the results is indicated generally by the reference numeral 1000. The plot 1000 is similar to the plot 900, so duplicate description may be omitted. Here, an additional selection from the Settings menu is active, namely a Tilt Compensation choice 1028. Thus, this display setting allows the user to view the results without the tilt. The measured tilt is still reported in the subtitle bar, but here, the graph accounts for it. A perfect set of data, regardless of system tilt or modulation related level differences, would be represented as a horizontal line at 0 spanning the whole frequency. Thus, this view makes it even easier to identify potential network impairments.

Figure 11:
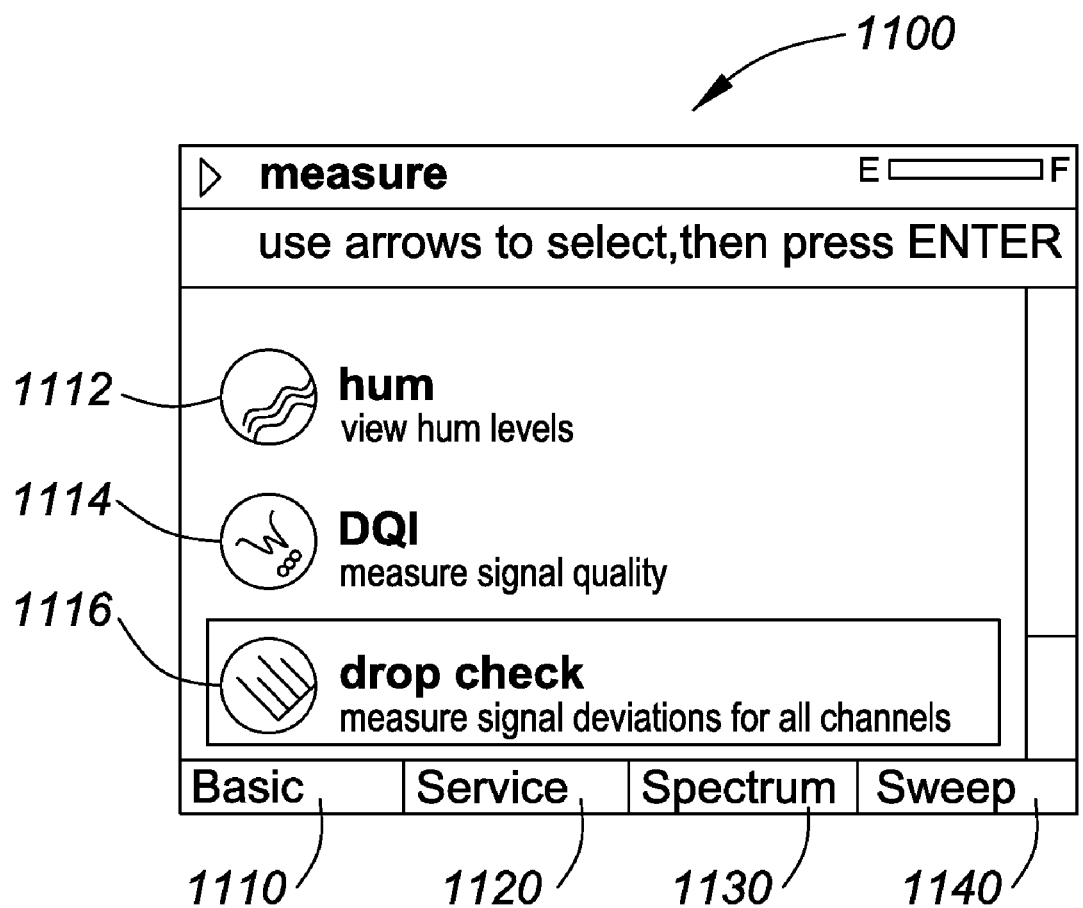
FIG. 11 is a graphical diagram of a measurement menu in accordance with an exemplary embodiment of the present disclosure.

Turning to FIG. 11, a measurement menu with animation options is indicated generally by the reference numeral 1100. The menu 1100 includes pull-up menu tabs for basic 1110, service 1120, spectrum 1130, and sweep 1140. The basic pull-up menu includes selections for hum mode 1112 to view hum levels, DQI mode 1114 to measure signal quality, and drop check mode 1116 to measure signal deviation for all channels.

In operation, the drop check mode can be used with or without animation. When animation is enabled, the user is walked through two animation screens that show what is being done to a full scan to get to the final results of the drop check mode. There are also two separate paths one can take through the animation sequence. The first screen is a full scan graph of the channels included in the regression. The second screen is a view of the channels after they have been either tilt or type compensated. When the view is tilt compensated, all channels may be adjusted up or down based on the measured tilt of the system. When the view is type compensated, all channels may be adjusted up or down based on their type and level relative to the left most channel. For example, if the channels between 50-500 MHz are all analog and the channels higher than 500 MHz are QAM 256, the digital channels may be adjusted upward so that they are at a similar level to the analog channels.

In addition to selecting the second screen of the animation, the user is also provided with an option to decide whether to view the data as a bar graph, or to view the data as a filled graph. Each graph displays the same data, but renders certain aspects easier to identify. The default is to use a filled graph for the second screen of the animation and drop check mode.

Once the user has walked through the two animation screens, they reach the drop check mode storyboard. The storyboard provides a complete view of the type and tilt compensated data, and displays the deviation of the channel to the computed best fit line. The final mode screen allows for displaying results from limit checks, and also allows the user to enable or disable animation and select the screen to be used as the second screen of the animation. In an alternate embodiment, the storyboard graph might only show type or tilt compensated data without such a user configuration option.

Figure 12:
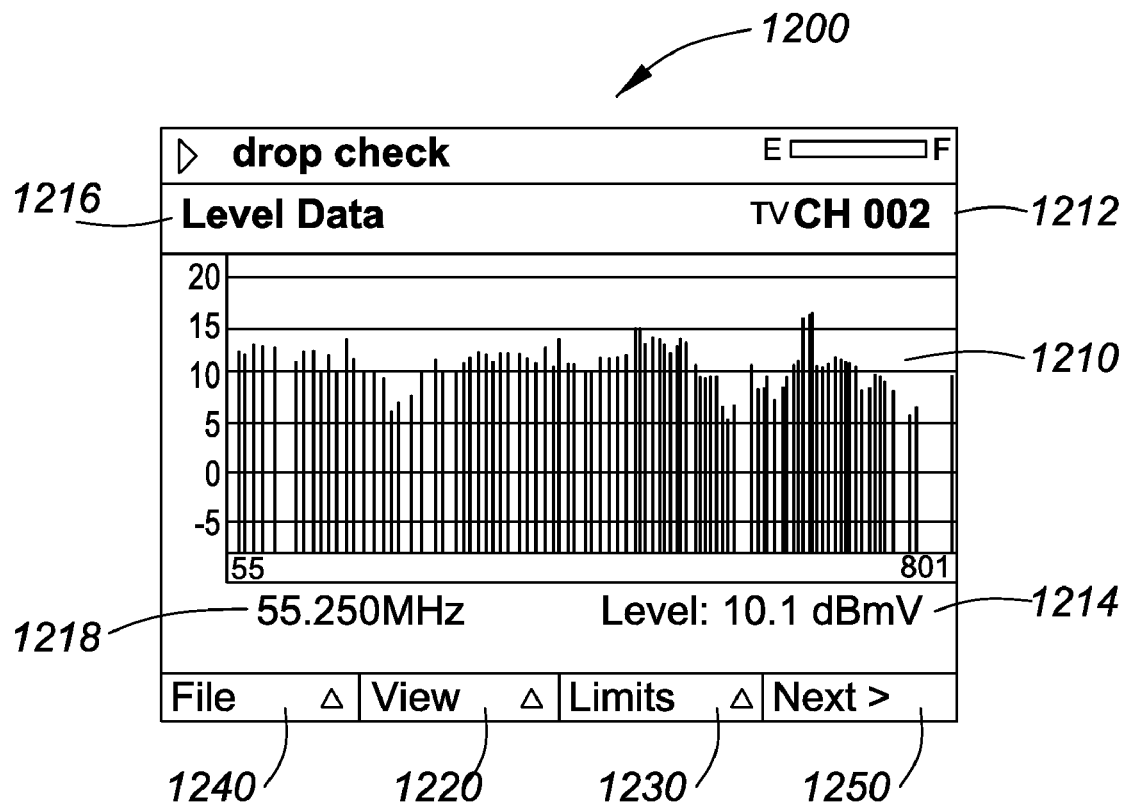
FIG. 12 is a bar graph diagram of measured level versus frequency for drop check results in accordance with an exemplary embodiment of the present disclosure.

Turning now to FIG. 12, a drop check storyboard graph is indicated generally by the reference numeral 1200. The graph 1200 includes a bar plot 1210 showing measured level in dBmv on the vertical axis versus frequency in MHz on the horizontal axis for all channels, a selected channel indicator 1212, a selected channel data level indicator 1214, a level data indicator 1216, and a selected channel frequency indicator 1218. There are also pull-up tabs for file 1240, view 1220, limits 1230, and next channel 1250. Here, the channel indicator 1212 shows TV Channel 002, the frequency indicator 1218 shows 55.250 MHz, and the level indicator 1214 shows a measured level of 10.1 dBmV.

In operation, after the user selects the drop check mode, the mode will be started and the first screen displayed will be the level view plot 1200, including a full scan of the levels to be included in the regression, without any limit checking data displayed.

Figure 13:
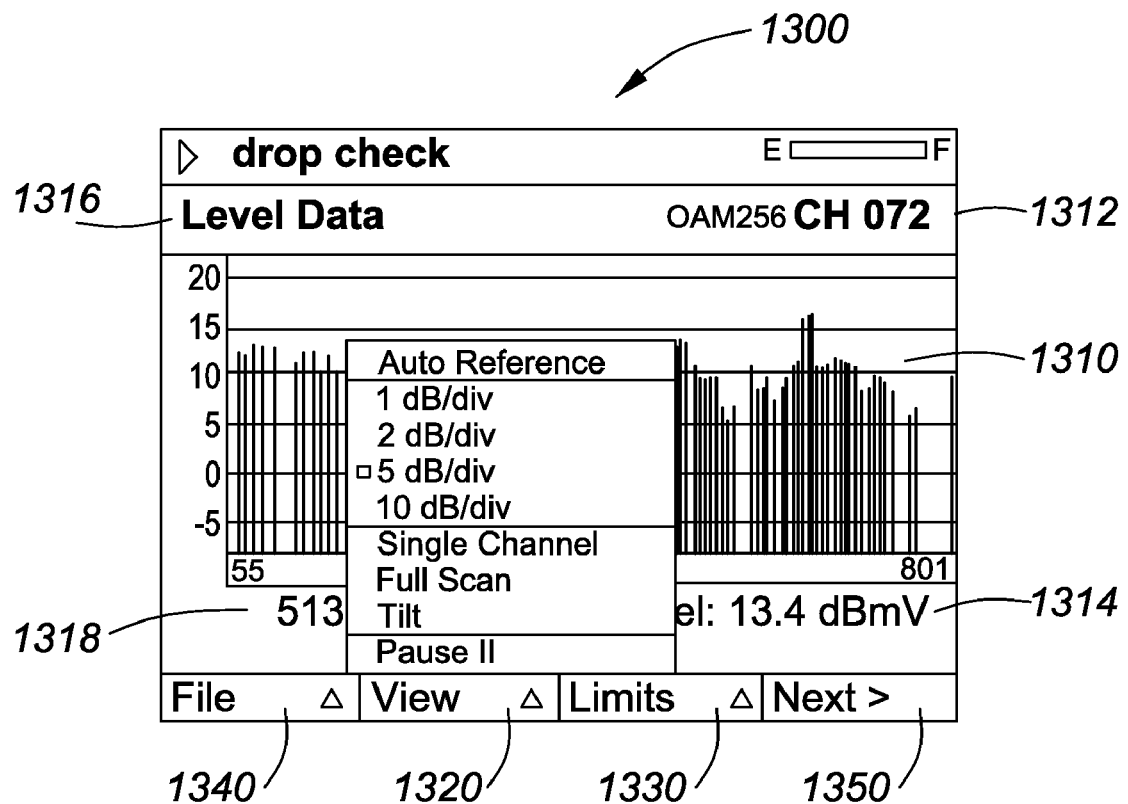
FIG. 13 is another bar graph diagram of measured level versus frequency for drop check results in accordance with an exemplary embodiment of the present disclosure.

As shown in FIG. 13, another drop check storyboard graph is indicated generally by the reference numeral 1300. The graph 1300 is similar to the graph 1200 of FIG. 12, so duplicate description may be omitted.

Here, the channel indicator 1312 shows QAM256 Channel 072, the frequency indicator 1318 shows 513 MHz, and the level indicator 1314 shows a measured level of 13.4 dBmV. Moreover, the view pull-up menu 1320 has been activated to display selections for Auto Reference, 1 dB/div, 2 dB/div, 5 dB/div, 10 dB/div, Single Channel, Full Scan, Tilt, and Pause.

In operation, the view menu options are available to the user at the first and all following screens. After the user selects next channel tab 1350, the mode transitions to either a view of the tilt compensated or type compensated data. In this embodiment, the user has the option to select any item on the last screen, with tilt compensation being the default.

Figure 14:
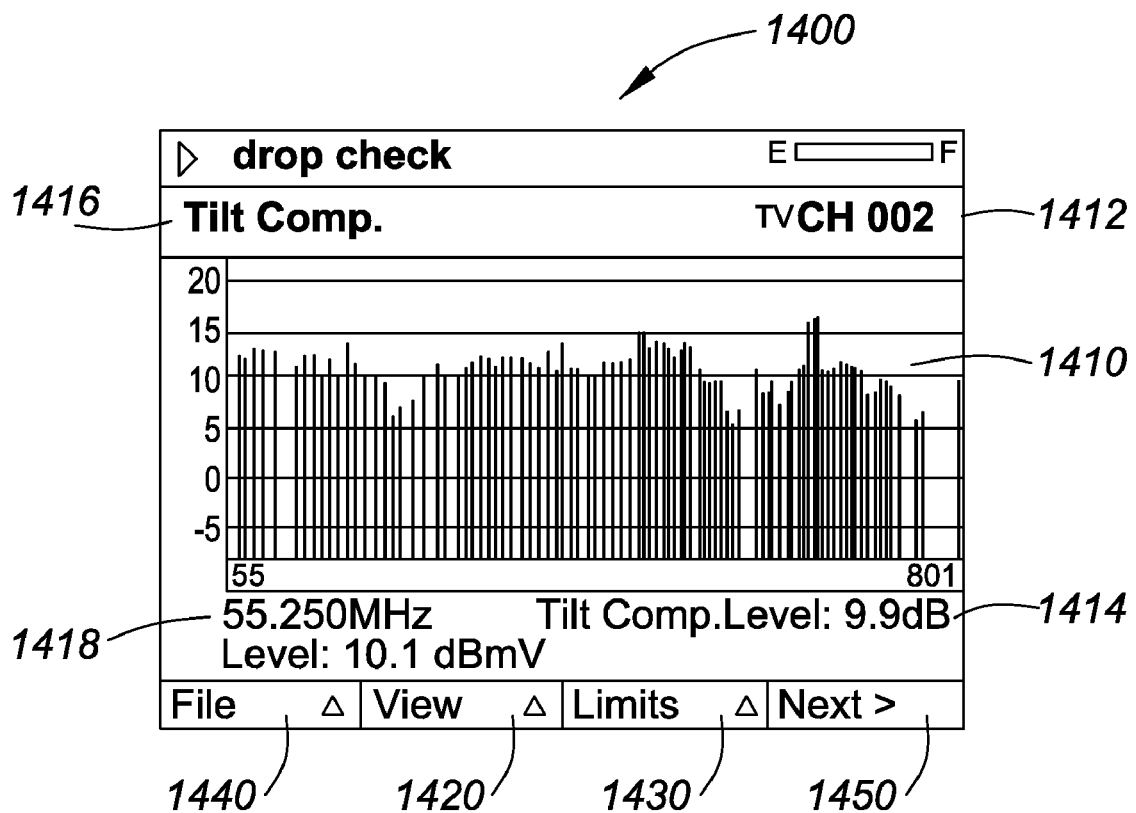
FIG. 14 is still another bar graph diagram of measured level versus frequency for drop check results in accordance with an exemplary embodiment of the present disclosure.

Turning to FIG. 14, another drop check storyboard bar graph for a tilt compensated view is indicated generally by the reference numeral 1400. The graph 1400 is similar to the graph 1200 of FIG. 12, so duplicate description may be omitted.

Here, the channel indicator 1412 shows TV Channel 002, the tilt compensated level 1414 is 9.9 dB, the view mode indicator 1416 indicates Tilt Compensation view, the selected frequency indicator 1418 shows 55.250 MHz, and the level indicator 1408 shows 10.0 dBmV at the selected frequency. A Back tab 1480 permits transitions to the previous view displayed.

In operation, after the user selects the Next tab 1450, the mode will transition to either a view of the tilt compensated or type compensated data. This decision is a configurable item on the last screen, with tilt compensation being the preferred default.

Figure 15:
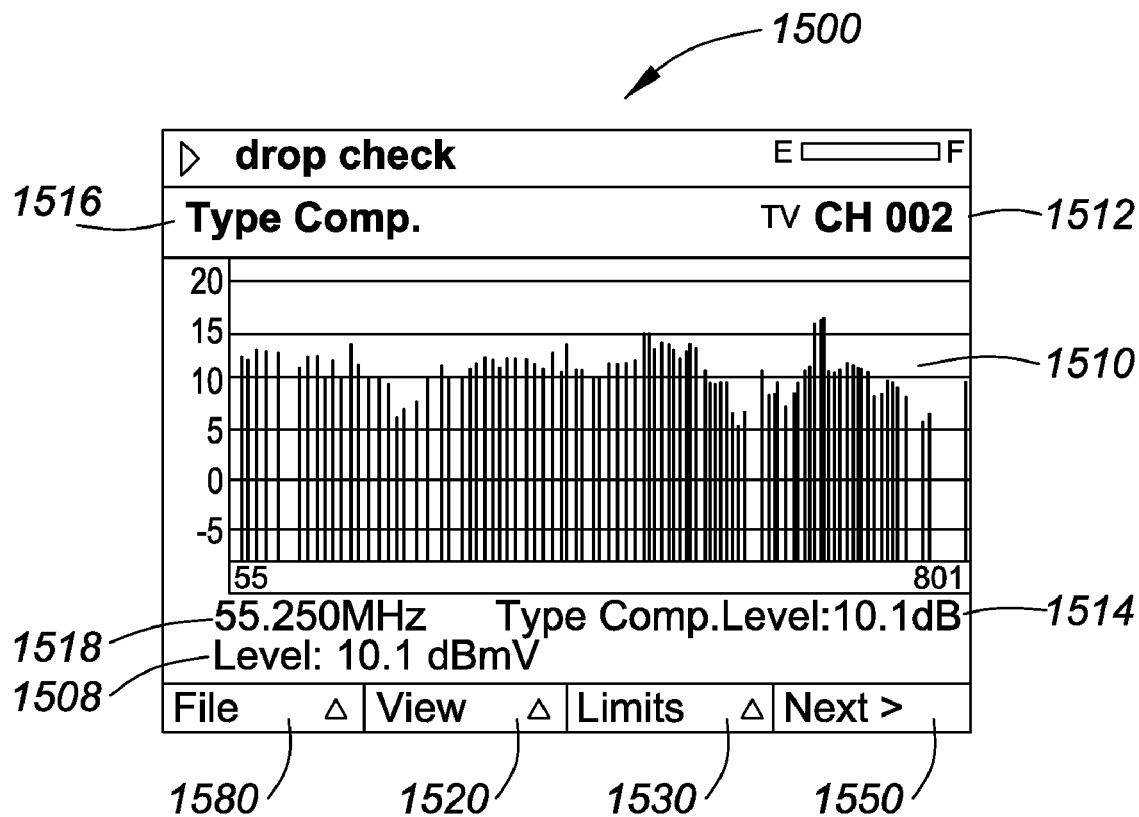
FIG. 15 is yet another bar graph diagram of measured level versus frequency for drop check results in accordance with an exemplary embodiment of the present disclosure.

Turning now to FIG. 15, a drop check storyboard bar graph for a type compensated view is indicated generally by the reference numeral 1500. The graphical view 1500 is similar to the graphical view 1400, so duplicate description may be omitted. The type compensated view 1500 includes a channel indicator 1512 showing TV Channel 002, a type compensation level indicator 1514 showing a level of 10.1 dB, a Type Compensation indicator 1516, a selected frequency indicator 1518 showing 55.250 MHz, and a selected frequency level indicator 1508 showing a level of 10.1 dBmV at the selected frequency.

In operation, while tilt compensation will raise or lower all channels so that the displayed tilt in the system is zero, type compensation will raise or lower all channels so that they are all equal regardless of type. Thus, there may still be a noticeable tilt in the data set when viewed with type compensation.

Figure 16:
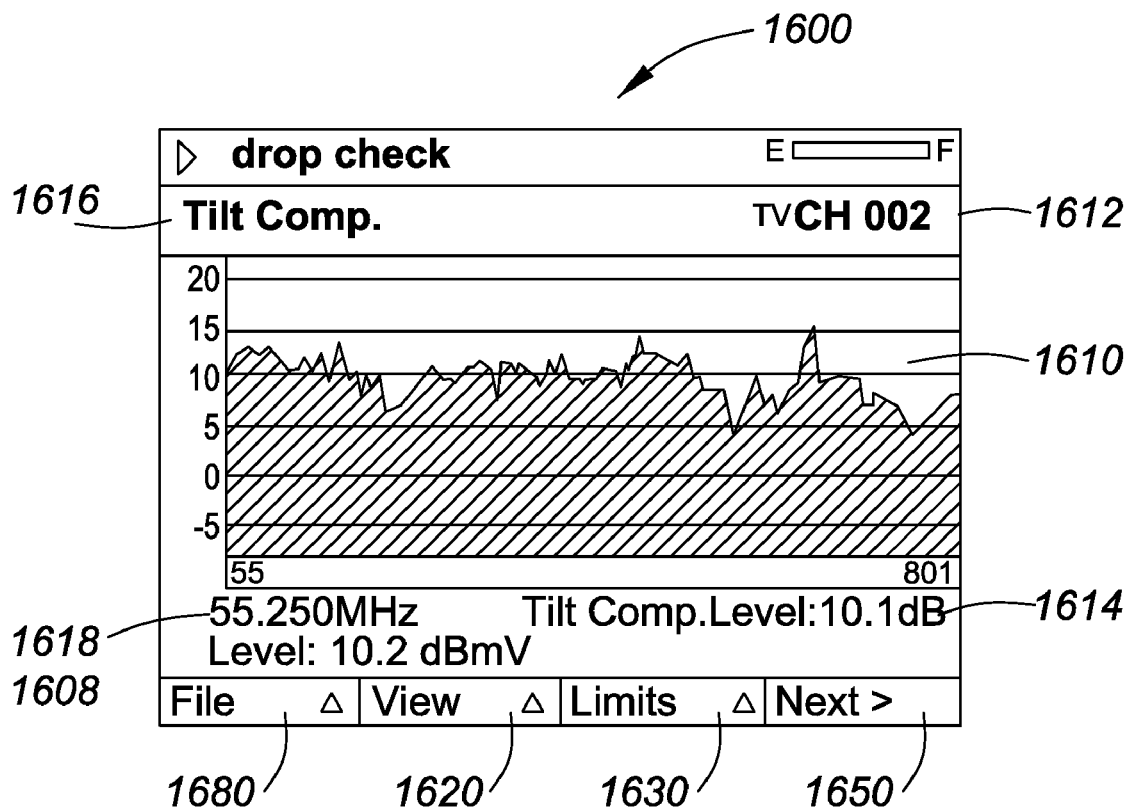
FIG. 16 is a filled graph diagram of measured level versus frequency for drop check results in accordance with an exemplary embodiment of the present disclosure.

As shown in FIG. 16, a drop check storyboard filled graph for a tilt compensated view is indicated generally by the reference numeral 1600. The graph 1600 is similar to the graph 1400 of FIG. 14, so duplicate description may be omitted.

Here, the channel indicator 1612 shows TV Channel 002, the tilt compensated level 1614 is 10.1 dB, the view mode indicator 1616 indicates Tilt Compensation view, the selected frequency indicator 1618 shows 55.250 MHz, and the level indicator 1608 at the selected frequency shows 10.2 dBmV.

Figure 17:
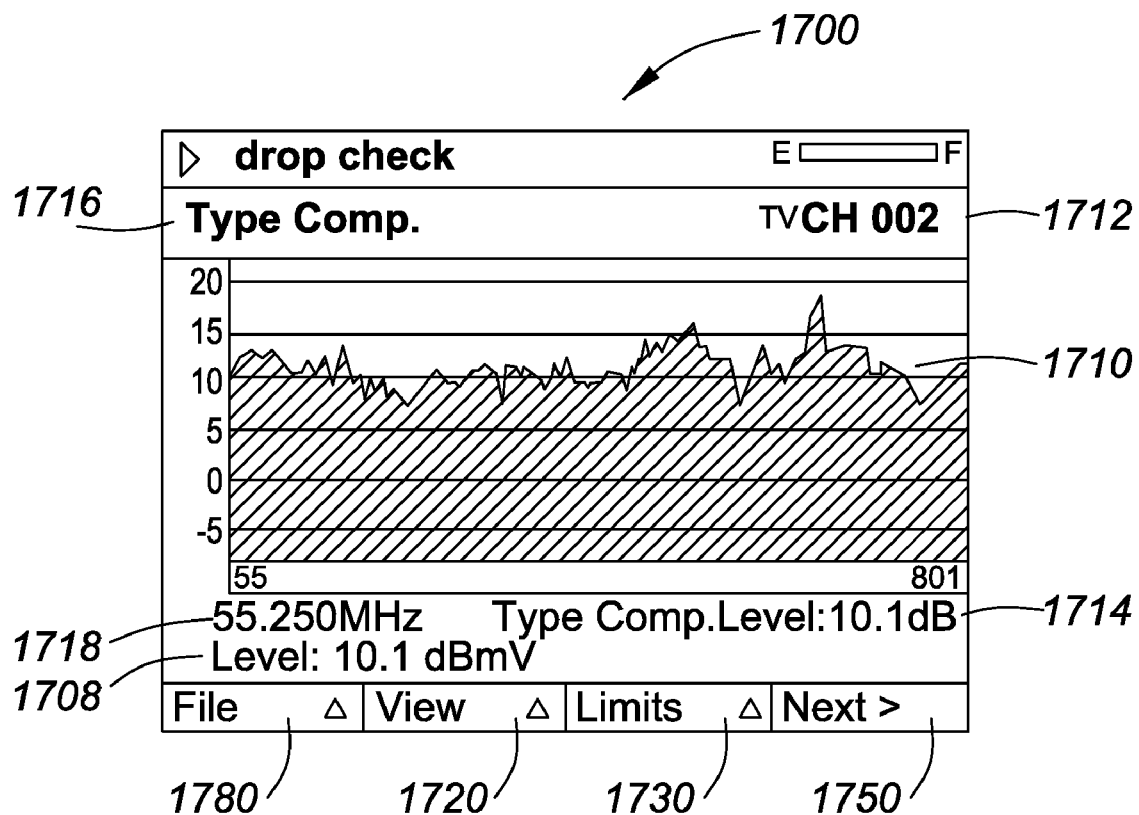
FIG. 17 is another filled graph diagram of measured level versus frequency for drop check results in accordance with an exemplary embodiment of the present disclosure.

Turning to FIG. 17, a drop check storyboard filled graph for a type compensated view is indicated generally by the reference numeral 1700. The graph 1700 is similar to the graph 1500 of FIG. 15, so duplicate description may be omitted. The type compensated view 1700 includes a channel indicator 1712 showing TV Channel 002, a type compensation level indicator 1714 showing a level of 10.1 dB, a Type Compensation view indicator 1716, a selected frequency indicator 1718 showing a frequency of 55.250 MHz, and a selected frequency level indicator 1708 showing a level of 10.1 dBmV at the selected frequency.

In operation, after the Next button 1750 is selected, the display will change to the final mode to view the deviation for each channel. There are two screen options printed here for viewing the data, one based on a bar type graph, and the other based on a filled type graph.

Figure 18:
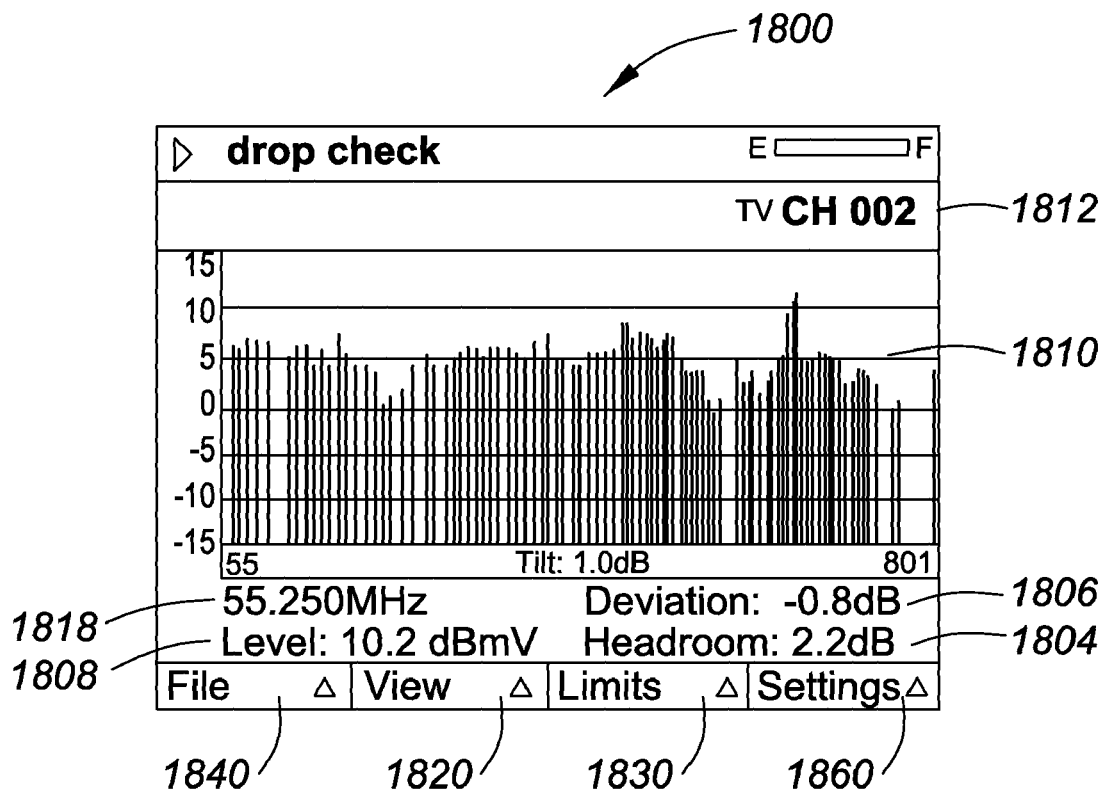
FIG. 18 is a bar graph diagram of measured level versus frequency for drop check results in accordance with an exemplary embodiment of the present disclosure.

Turning now to FIG. 18, a drop check bar graph with limits off is indicated generally by the reference numeral 1800. The graphical view 1800 is similar to the view 1200 of FIG. 12, so duplicate description may be omitted. The view 1800 includes a selected channel indicator 1812 showing TV Channel 002, a selected channel frequency indicator 1818 showing a selected frequency of 55.250 MHz, a selected channel level indicator 1808 showing a level of 10.2 dBmV at the selected frequency, a deviation indicator 1806 showing a deviation of −0.8 dB, and a headroom indicator 1804 showing headroom of 2.2 dB. There are also pull-up tabs for file 1840, view 1820, limits 1830, and Settings 1860.

Figure 19:
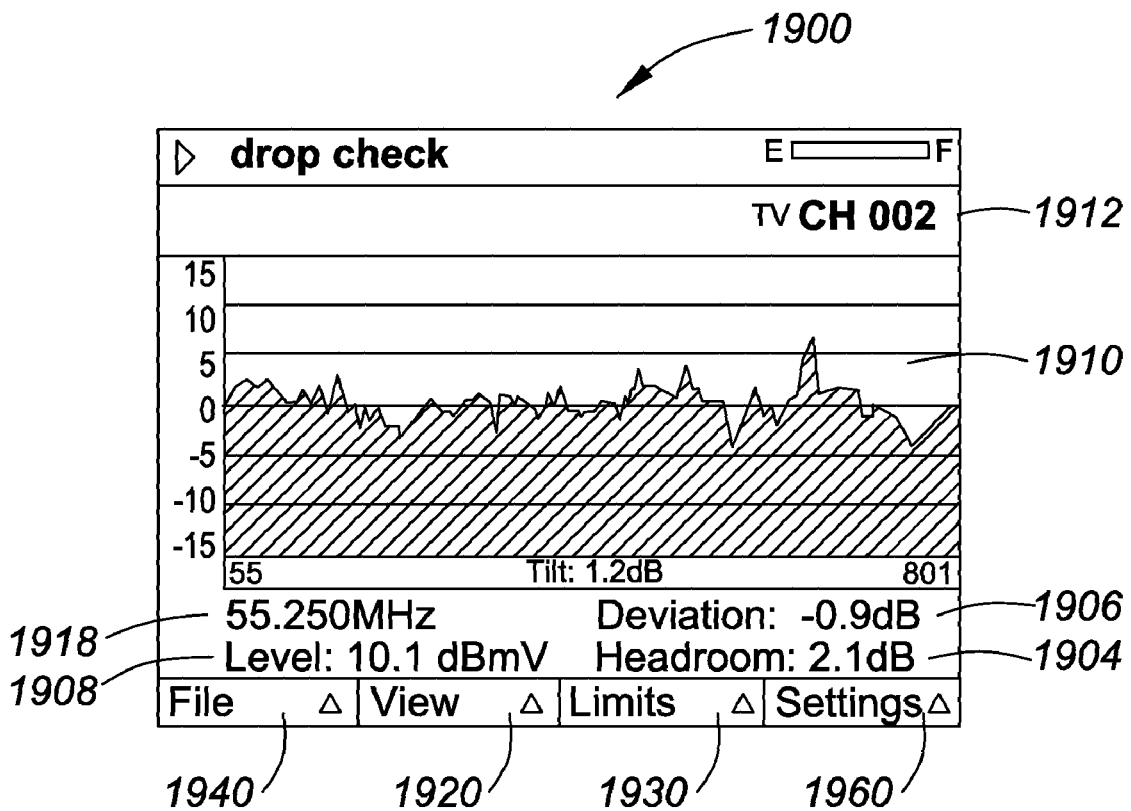
FIG. 19 is a filled graph diagram of measured level versus frequency for drop check results in accordance with an exemplary embodiment of the present disclosure.

As shown in FIG. 19, a drop check filled graph with limits off is indicated generally by the reference numeral 1900. The graphical view 1900 is similar to the view 1800 of FIG. 18, so duplicate description may be omitted. The view 1900 includes a selected channel indicator 1912 showing TV Channel 002, a selected channel frequency indicator 1918 showing a selected frequency of 55.250 MHz, a selected channel level indicator 1908 showing a level of 10.1 dBmV at the selected frequency, a deviation indicator 1906 showing a deviation of −0.9 dB, and a headroom indicator 1904 showing headroom of 2.1 dB.

Figure 20:
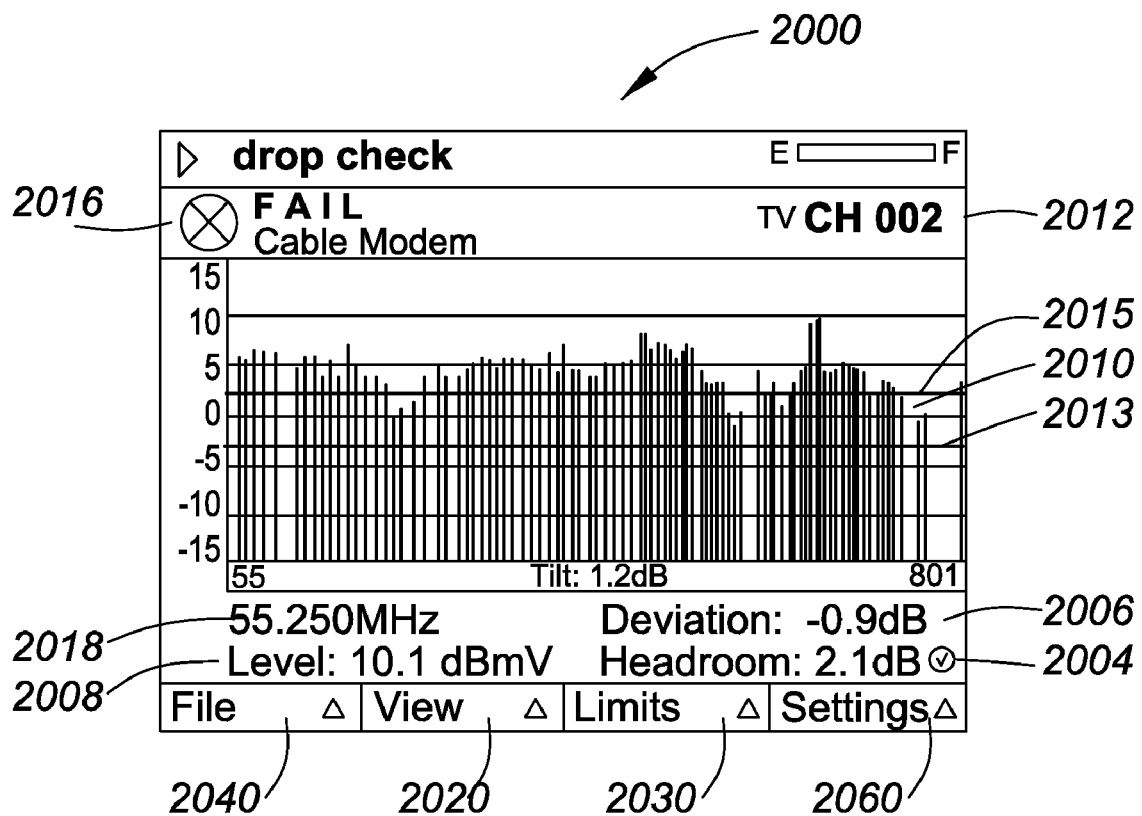
FIG. 20 is a bar graph diagram of measured level versus frequency for drop check results in accordance with an exemplary embodiment of the present disclosure.

Turning to FIG. 20, a drop check bar graph view with limits on is indicated generally by the reference numeral 2000. The bar graph view 2000 with limits on is similar to the bar graph view 1800 of FIG. 18 with limits off, so duplicate description may be omitted. The view 2000 includes a selected channel indicator 2012 showing TV Channel 002, lower and upper limit lines 2013 and 2015, respectively, a selected channel frequency indicator 2018 showing a selected frequency of 55.250 MHz, a selected channel level indicator 2008 showing a level of 10.1 dBmV at the selected frequency, a deviation indicator 2006 showing a deviation of −0.9 dB, and a headroom indicator 2004 showing headroom of 2.1 dB. In addition, the view 2000 includes a test failure indicator 2016, which indicates a failure because at least one of the frequency levels falls below the lower limit 2013 or above the upper limit 2015.

Figure 21:
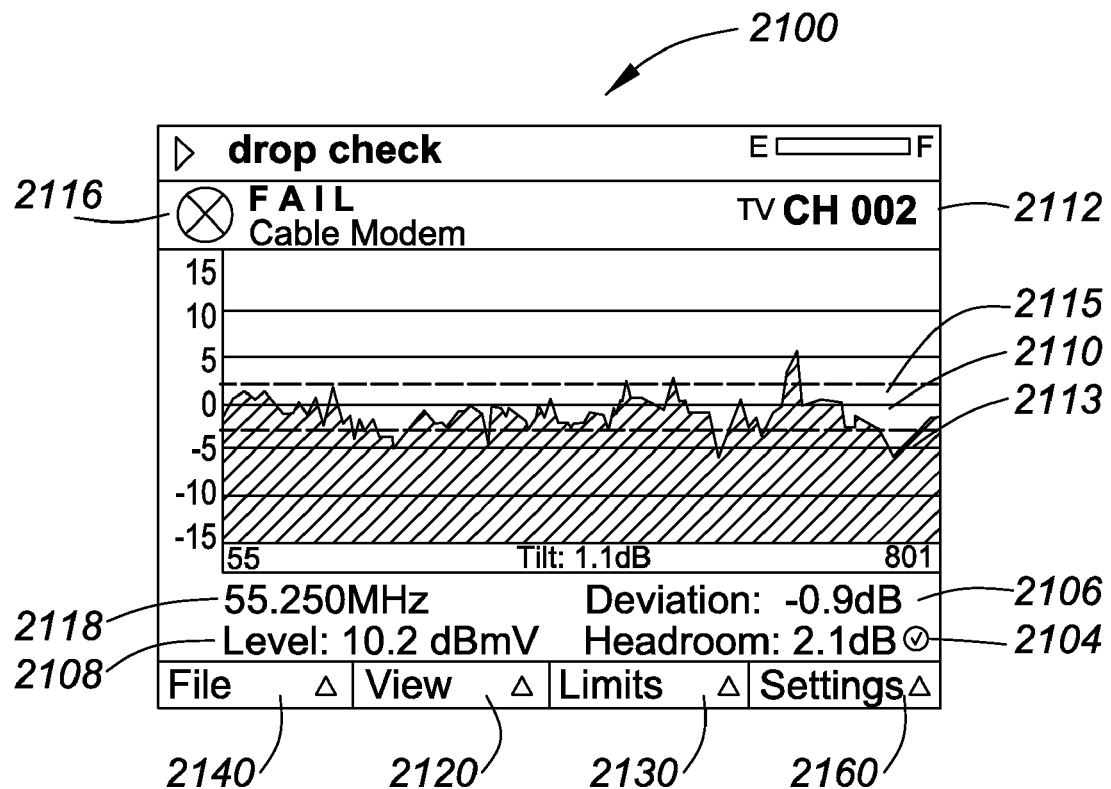
FIG. 21 is a filled graph diagram of measured level versus frequency for drop check results in accordance with an exemplary embodiment of the present disclosure.

Turning now to FIG. 21, a drop check filled graph with limits on is indicated generally by the reference numeral 2100. The bar graph view 2100 is similar to the bar graph view 2000 of FIG. 20, so duplicate description may be omitted. The view 2100 includes filled graph data 2110 in place of the bar graph data 2010 of FIG. 20.

In operation, the views 2100 and 2000 of FIGS. 21 and 20, which both have limits on or active, may be compared with the views 1900 and 1800 of FIGS. 19 and 18, which both have limits off or inactive. Limits are checked on the Tilt, Level, and Deviation values displayed on the screen. The Headroom value displayed is equal to the Maximum Deviation limit value minus the absolute value of the channel's deviation. Values involved in the calculation may be rounded to dB tenths before taking the difference. In addition, selectable options for the File, Limits, and Settings pull-up menus are described with respect to FIGS. 22 through 24.

Figure 22:
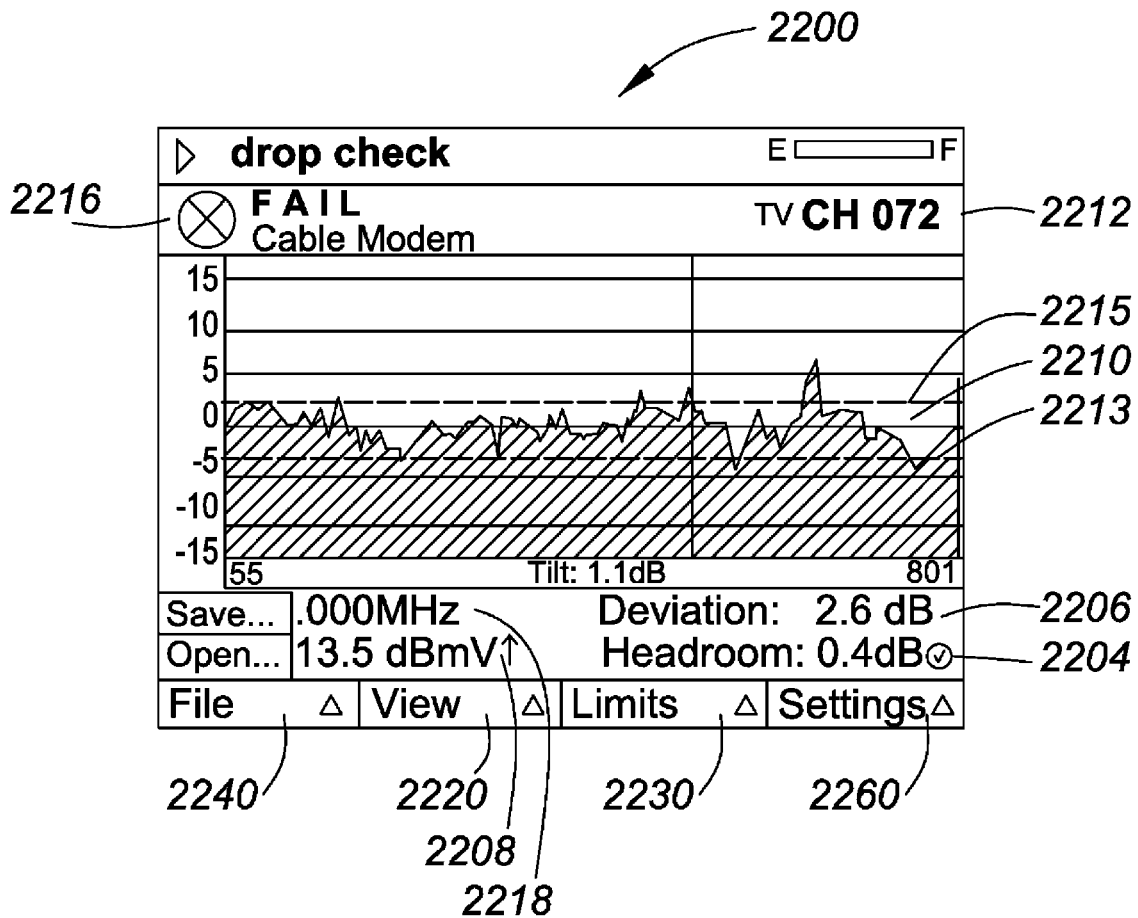
FIG. 22 is an additional filled graph diagram of measured level versus frequency for drop check results in accordance with an exemplary embodiment of the present disclosure.

As shown in FIG. 22, a drop check view with activated File menu is indicated generally by the reference numeral 2200. The view 2200 is similar to the view 2100 of FIG. 21, so duplicate description may be omitted. Here, the activated file menu 2240 includes selections for Save or Open.

Figure 23:
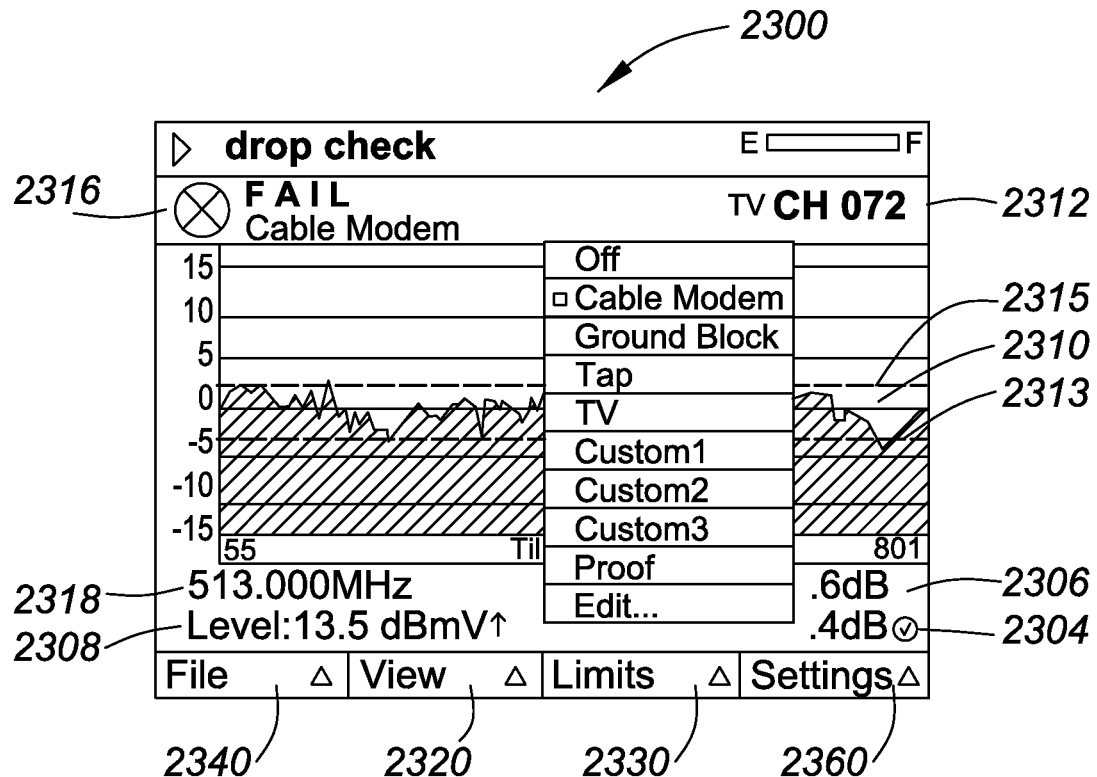
FIG. 23 is another filled graph diagram of measured level versus frequency for drop check results in accordance with an exemplary embodiment of the present disclosure.

Turning to FIG. 23, a drop check view with activated Limits menu is indicated generally by the reference numeral 2300. The view 2300 is similar to the view 2200 of FIG. 22, so duplicate description may be omitted. Here, the activated limits menu 2330 includes selections for Off, Cable Modem, Ground Block, Tap, TV, Custom1, Custom2, Custom3, Proof, or Edit.

Figure 24:
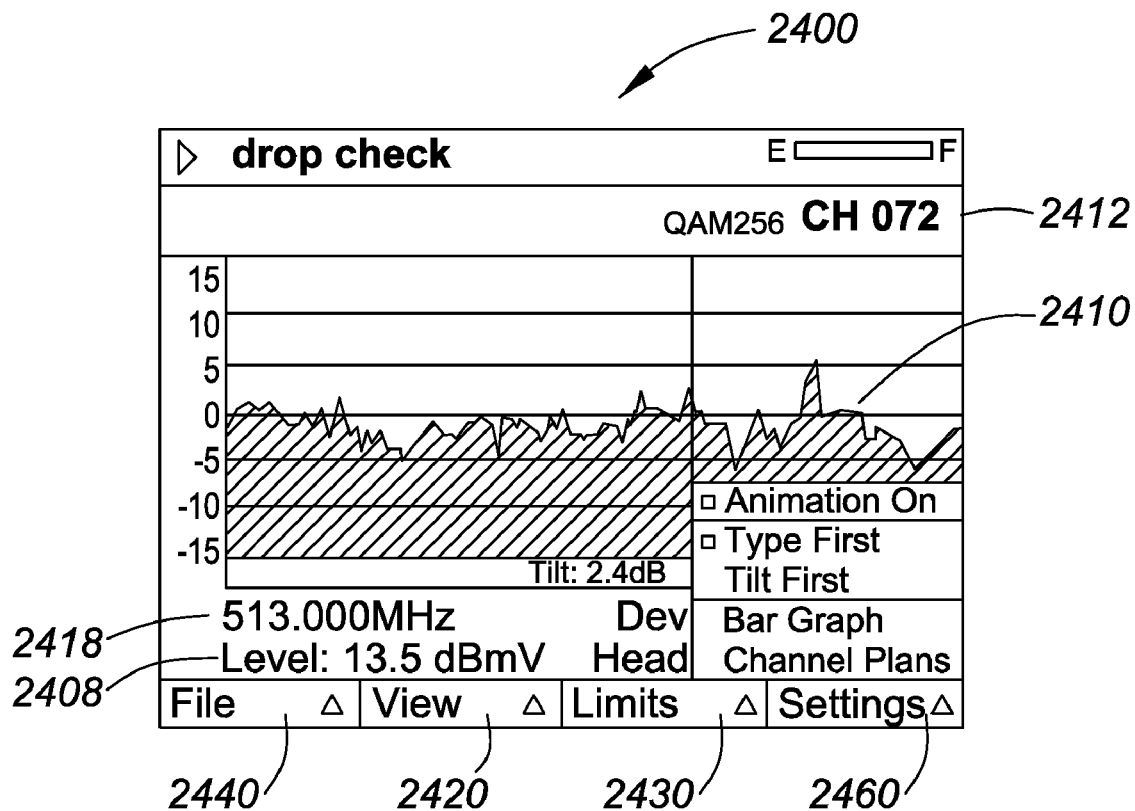
FIG. 24 is yet another filled graph diagram of measured level versus frequency for drop check results in accordance with an exemplary embodiment of the present disclosure.

Turning now to FIG. 24, a drop check view with activated Settings menu is indicated generally by the reference numeral 2400. The view 2400 is similar to the view 2300 of FIG. 23, so duplicate description may be omitted. Here, the activated settings menu 2460 includes selections for Animation On, Type First, Tilt First, Bar Graph, or Channel Plans.

In operation, the settings menu allows enabling or disabling the animation sequence. If animation is disabled, the mode view will open directly to the final screens, such as described above. If animation is enabled, the choice to set the second screen to be either Type or Tilt Compensation as the view is also available. If the Bar Graph option is enabled, the preferred default setting is that the mode view will display data using a bar graph for all screens. Otherwise, the mode view will use a filled graph.

The above and alternate embodiments provide a method and apparatus for detection of network impairments through tilt-normalized measurement data. Alternate embodiments may include determining the susceptibility of a digital receiver to intermodulation (IM) distortion. The IM distortion results when the total power received across all digital and analog signal frequencies exceeds by a critical amount the strength of the selected digital signal being demodulated. Embodiments may also use a level-versus-frequency signal tilt compensation feature, which enables a tester 100 to evaluate a receiver connected at a different location in the network from that of the tester.

Although illustrative embodiments have been described herein with reference to the accompanying drawings, it is to be understood that the present disclosure is not limited to those precise embodiments, and that various other changes and modifications may be effected therein by those of ordinary skill in the pertinent art without departing from the scope or spirit of the present disclosure. All such changes and modifications are intended to be included within the scope of the present disclosure as set forth in the appended claims.

What is claimed is:

1. A method for detecting network impairments through normalization of measurement data, the method comprising:
    collecting data for a network signal;
    computing a best-fit tilt for the collected data, including computing an offset for each group of collected data having different modulation types and adjusting the best-fit tilt, at each group, by the corresponding offset;
    performing tilt-normalization of the collected data responsive to the computed best-fit tilt; and
    determining whether the tilt-normalized data crosses a threshold, and if so, pattern matching the tilt-normalized data to detect at least one network impairment.

2. The method of claim 1, further comprising displaying results indicative of the at least one network impairment.

3. The method of claim 1 wherein the network signal is a composite of analog and digital channels, and at least one digital channel carries video data.

4. The method of claim 1, further comprising determining a level-versus-frequency tilt of said network signal.

5. The method of claim 4 wherein said level-versus-frequency tilt of said network signal is determined at an input of a digital receiver.

6. The method of claim 5 further comprising compensating for a differing signal tilt at a location different from a location of said digital receiver by utilizing said level-versus-frequency tilt.

7. The method of claim 1, further comprising generating a tilt line for a plurality of channels in said network signal to use as a reference power.

8. The method of claim 7, further comprising outputting a susceptibility result for a first digital channel in accordance with said reference power so that a same test device will give a same susceptibility result at different points in a network having different tilts.

9. The method of claim 1 wherein each point of collected data comprises a level, a frequency, and a type.

10. The method of claim 9 wherein the type may be analog or digital, where the digital type may include Quadrature Amplitude Modulation (QAM) data.

11. The method of claim 1 wherein computing the best-fit tilt further includes:
    computing the tilt between maximum points;
    choosing the tilt computation with the greatest frequency span to be the tilt of the collected data; and
    if the greatest frequency span is shared by multiple tilts, choosing the minimum tilt of those tilts sharing the greatest frequency span.

12. The method of claim 1 wherein computing the best-fit tilt further comprises computing a best-fit line to the collected data using a linear regression to determine constants such that the sum of the squares of the error is minimized, a first constant corresponds to the measured slope of the collected data, and other constants correspond to the computed offsets.

13. The method of claim 12 wherein the best-fit tilt is calculated by using a weighted data set to allow for assigning low weights to outliers and increase the reliability of the linear regression.

14. The method of claim 12, further comprising performing tilt normalization limit checks for data points that reside outside of a delta from the computed linear regression.

15. The method of claim 1, further comprising analyzing an error distribution of the tilt-normalized data.

16. The method of claim 1 wherein the threshold is computed differently for each different modulation type.

17. The method of claim 16 wherein the threshold for an analog channel data point is less than the threshold for a digital channel data point.

18. An apparatus for detecting network impairments through normalization of measurement data, the apparatus comprising:
    an input unit for collecting data from a network signal;
    a tilt unit in signal communication with the input unit for computing a best-fit tilt for the collected data, including computing an offset for each group of collected data having different modulation types and adjusting the best-fit tilt, at each group, by the corresponding offset, and performing tilt-normalization of the collected data responsive to the computed best-fit tilt; and
    a pattern-matching unit in signal communication with the tilt unit for determining whether the tilt-normalized data crosses a threshold, and if so, pattern matching the tilt-normalized data to detect at least one network impairment.

19. The apparatus of claim 18, further comprising:
    an error value distribution analysis unit in signal communication with the tilt unit for normalizing and analyzing error values for each of a plurality of frequencies or channels; and
    a display unit in signal communication with the pattern matching unit and the error value distribution analysis unit for displaying results indicative of the at least one network impairment.

* * * * *